US007120358B2

(12) United States Patent
Okada et al.

(10) Patent No.: US 7,120,358 B2
(45) Date of Patent: Oct. 10, 2006

(54) OPTICAL PACKET ROUTING NETWORK SYSTEM BASED ON OPTICAL LABEL SWITCHING TECHNIQUE

(75) Inventors: Akira Okada, Tokyo (JP); Kazutoshi Kato, Isehara (JP); Kazuto Noguchi, Atsugi (JP); Yoshihisa Sakai, Isehara (JP); Takashi Sakamoto, Zama (JP); Morito Matsuoka, Atsugi (JP); Sen-ichi Suzuki, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 466 days.

(21) Appl. No.: 10/756,561

(22) Filed: Jan. 13, 2004

(65) Prior Publication Data

US 2004/0146300 A1 Jul. 29, 2004

Related U.S. Application Data

(62) Division of application No. 09/644,324, filed on Aug. 23, 2000, now Pat. No. 6,782,210.

(30) Foreign Application Priority Data

Aug. 25, 1999 (JP) ................... 11-238794
Mar. 14, 2000 (JP) ............... 2000-070872

(51) Int. Cl.
*H04B 10/08* (2006.01)
*H04J 14/00* (2006.01)
*H04J 14/02* (2006.01)
(52) U.S. Cl. ............................. 398/49; 398/31; 398/32; 398/33; 398/57; 398/79
(58) Field of Classification Search ............. 398/31, 398/32, 33, 49, 57, 79
See application file for complete search history.

(56) References Cited

U.S. PATENT DOCUMENTS 5,175,777 A 12/1992 Böttle
5,319,484 A 6/1994 Jacob et al.

(Continued)

FOREIGN PATENT DOCUMENTS

EP 0 223 258 A2 5/1987

(Continued)

OTHER PUBLICATIONS

D.J. Blumenthal et al., *First Demonstration of Multihop All-Optical Packet Switching*, IEEE Photonics Technology Letters, vol. 6, No. 3, pp. 457-460, Mar. 1994.

(Continued)

*Primary Examiner*—M. R. Sedighian
(74) *Attorney, Agent, or Firm*—Workman Nydegger

(57) ABSTRACT

An optical communication equipment comprises shared optical sources 88a–88d to be shared by communication nodes 100a–100d, the wavelengths of optical signals 76a–76d are converted into desired wavelengths $\lambda a$–$\lambda d$ according to the addressed information of the corresponding optical label signals 77a–77d by using the shared optical sources 88a–88d, and routed to the addressed communication nodes without being converted into electrical signals by using the wavelength routing function of the cyclic-wavelength arrayed-waveguide grating (AWG) 120. The load of each communication node can be reduced by incorporating the multi-wavelength optical sources, which can be shared among individual communication nodes, into the router 80. Further, each communication node is provided with an optical gate or the like for returning the optical signal to the communication node from which the optical signal has been transmitted through the router 80 in order to adjust the transmission time lag between the optical signal and the corresponding optical label signal by the controllers 110a–110d.

3 Claims, 28 Drawing Sheets

U.S. PATENT DOCUMENTS

| | | | |
|---|---|---|---|
| 5,341,234 A * | 8/1994 | Suzuki et al. | 398/51 |
| 5,488,501 A * | 1/1996 | Barnsley | 398/51 |
| 5,504,607 A | 4/1996 | Smith et al. | |
| 5,617,233 A | 4/1997 | Boncek | |
| 6,433,902 B1 | 8/2002 | Chiaroni et al. | |
| 6,512,612 B1 * | 1/2003 | Fatehi et al. | 398/49 |

FOREIGN PATENT DOCUMENTS

| | | |
|---|---|---|
| EP | 0 494 831 A2 | 7/1992 |
| FR | 2 709 839 | 3/1995 |
| JP | 59-036642 | 2/1984 |
| JP | 63-006993 A | 1/1988 |
| JP | 01-126095 | 5/1989 |
| JP | 05-268268 A | 10/1993 |
| JP | 06-216850 | 8/1994 |
| JP | 06-232843 A | 8/1994 |
| JP | 06-235946 A | 8/1994 |
| JP | 06-308347 A | 11/1994 |
| JP | 7-507188 | 3/1995 |
| JP | 08-195732 A | 7/1996 |
| JP | 08-237266 A | 9/1996 |
| JP | 09-074423 | 9/1997 |
| JP | 11-27707 A | 1/1999 |
| WO | WO 93/21706 | 10/1993 |

OTHER PUBLICATIONS

A. Carena, et al., *OPERA: An Optical Packet Experimental Routing Architecture with Label Swapping Capability,* Journal of Lightwave Technology, vol. 16, No. 12, pp. 2135-2145, Dec. 1998.

K. Kato et al., *32×32 Full-mesh (1024 path) Wavelength-routing WDM Network Based on Uniform-loss Cyclic-frequency Arrayed-waveguide Grating,* Electronics Letters, vol. 36, No. 15, pp. 1294-1295, Jul. 20, 2000.

* cited by examiner

|  | OUTPUT PORT | | | |
|---|---|---|---|---|
|  | 62a | 62b | 62c | 62d |
| 61a | λa | λb | λc | λd |
| 61b | λb | λc | λd | λa |
| 61c | λc | λd | λa | λb |
| 61d | λd | λa | λb | λc |

INPUT PORT

FIG.21

|  | OUTPUT PORT | | | |
|---|---|---|---|---|
|  | 131a | 131b | 131c | 131d |
| 130a | $\lambda a$ | $\lambda b$ | $\lambda c$ | $\lambda d$ |
| 130b | $\lambda b$ | $\lambda c$ | $\lambda d$ | $\lambda a$ |
| 130c | $\lambda c$ | $\lambda d$ | $\lambda a$ | $\lambda b$ |
| 130d | $\lambda d$ | $\lambda a$ | $\lambda b$ | $\lambda c$ |

(INPUT PORT labels rows 130a–130d)

FIG.27

OPTICAL PACKET ROUTING NETWORK SYSTEM BASED ON OPTICAL LABEL SWITCHING TECHNIQUE

CROSS-REFERENCE TO RELATED APPLICATIONS

This application is a divisional of U.S. patent application Ser. No. 09/644,324, filed on Aug. 23, 2000 now U.S. Pat. No. 6,782,210, which claims priority to Japanese Patent Application Nos. 238,794/1999 filed Aug. 25, 1999 and 070,872/2000 filed Mar. 14, 2000, the contents of which are incorporated herein by specific reference.

BACKGROUND OF THE INVENTION

1. Field of Invention

The present invention relates to an optical packet routing system for routing an optical signal by using the optical label signal carrying the control information necessary for the routing of the optical signal, more particularly, to a multiple-wavelength optical source unit to be used for a network system whose a plurality of communication nodes are connected by the wavelength routing system and an optical communication unit and an optical communication method to be used for an optical communication system whose internode communication among the communication nodes is made through a routing unit.

2. Description of the Art

With the explosive spread of the internets, and portable personal telephones and the like, the research and development activities for the establishment of large-capacity network are under way both at home and abroad. With the communication nodes constituting each of the existing networks, an optical signal transmitted through an optical fiber transmission line is converted into an electric signal; an address information and the like carried by the signal is read out; the signal is electrically switched to a desired output port according to the information; the signal is converted into an optical signal at the output port; and the optical signal is then transmitted through the optical fiber transmission line. However, with the exponential-growth in the communication traffic, in the near future, the routing processing capacity by the electrical routing processes is considered to reach its limit. To overcome this problem, it is important for the communication nodes to establish a routing method for enabling the routing of the signal within the optical layer, that is, a routing method for enabling the routing without converting the optical signal into the electric signal.

As a technique for realizing the above goal, the wavelength routing technique is coming to the fore. In the case of the wavelength routing technique as schematically illustrated in FIG. 1, any optical signal fed into a given input port can be routed selectively to different output ports according to its wavelength without being converted into an electric signal, by using an optical device (e.g., arrayed-waveguide grating) having a wavelength selectivity.

FIG. 2 schematically illustrates the general composition of the network system interconnecting a plurality of communication nodes by utilizing the wavelength routing function of the cyclic-wavelength arrayed-waveguide grating. In the case of this network system, with a cyclic-wavelength arrayed-waveguide grating 60 having a wavelength routing processing function, the optical signal transmitted from a communication node is routed in the form of the light according to its wavelength without undergoing any electrical processing for routing, so that high-speed routing is possible.

To illustrate the composition of FIG. 2, the network system comprises N number of communication nodes 30 (communication nodes #1–N) and a cyclic-wavelength arrayed-waveguide grating 60 having a wavelength routing processing function. Each communication node 30 comprises transmitter equipment 40 and receiver equipment 50. The transmitter equipment 40 comprises N number of optical sources 41 for transmitting optical signals having wavelengths $\lambda_1$–$\lambda_n$.

The optical signals (wavelength: $\lambda_1$–$\lambda_n$) transmitted from the transmitter equipment 40 of each communication node 30 are introduced into the input ports of the cyclic-wavelength arrayed-waveguide grating 60 having the wavelength routing processing function. The cyclic-wavelength arrayed-waveguide grating 60 routes the optical signals incoming from various communication nodes 30 to different output ports according to the wavelengths, $\lambda_1$–$\lambda_n$, of the optical signals. Since this routing processing of the optical signal is carried out according to the wavelength of the optical signal while maintaining the form of the light without being subjected to any electrical processing, the high-speed routing is possible.

The optical signals (wavelength: $\lambda_1$–$\lambda_n$) came out from the output ports of the cyclic-wavelength arrayed-waveguide grating 60. is introduced into the receiver equipment 50 in each communication node 30.

The detail of the wavelength routing processing by the cyclic-wavelength arrayed-waveguide grating 60 will be described referring to FIG. 3. Optical signals (wavelength: $\lambda_1$–$\lambda_4$), varying in wavelength transmitted from various communication nodes (#1–#4) are fed to the input ports 61a–61d of the cyclic-wavelength arrayed-waveguide grating 60. In this case, the optical signal transmitted from the communication node #1 to the input node 61a is outputted from the output port 62a when its wavelength is $\lambda_1$, from the output port 62b when its wavelength is $\lambda_2$, from the output port 62c when the wavelength is $\lambda_3$ and from 62d when the wavelength is $\lambda_4$.

The optical signal to be transmitted from the communication node #2 to the input port 61b is outputted from the output port 62d when its wavelength is $\lambda_1$, from the output port 62a when its wavelength is $\lambda_2$, from the output port 62b when its wavelength is $\lambda_3$, and from the output port 62c when its wavelength is $\lambda_4$.

The optical signal to be transmitted from the communication node #3 is outputted from the output port 62c when its wavelength is $\lambda_1$, from the output port 62d when its wavelength is $\lambda_2$, and from the output port 62a when its wavelength is $\lambda_3$, and from the output port 62b when its wavelength is $\lambda_4$.

The optical signal to be transmitted from the communication node #4 to the input port 61d is outputted from the output port 62b when its wavelength is $\lambda_1$, from the output port 62c when its wavelength is $\lambda_2$, from the output port 62d when its wavelength is $\lambda_3$, and from the output port 62a when its wavelength is $\lambda_4$.

Thus, by the routing to be carried out as described above, the optical signals having the same wavelengths respectively transmitted from the communication nodes #1–#4 will never be outputted from the same output port. In other words, the wavelength routing by using the cyclic-wavelength arrayed-waveguide grating as is shown in FIG. 3 is characterized by that the optical signals having the same wavelengths fed to different input ports of the grating are outputted from different output ports of the grating respectively, so that the conflict among the data having the same wavelengths with respect to the output port can be prevented.

However, in the case of conventional network system as is shown in FIG. 2, especially in the case of the network comprising N number of communication nodes, it is necessary to provide N number of optical sources with wavelengths strictly adapted to the wavelength characteristic of the cyclic-wavelength arrayed-waveguide grating with respect to each of the communication nodes and thus requiring N×N number of optical sources, which is a problem to be resolved. Especially, providing N number of optical sources for each communication node not only results in the increase in the burdens such as the increase in the size and cost of the communication node but also results in the increase in total cost of the network system.

Next, a prior art relating to the second embodiment of the present invention will be described.

Conventionally, as an optical communication system for carrying out the optical communication among a plurality of communication nodes through a router, a system shown in FIG. 4 has been available.

The communication nodes 100a–100d are respectively provided with one of the corresponding optical signal transmitters 71a–71d for respectively transmitting one of the corresponding optical signals 76a–76d and also respectively provided with one of the corresponding optical label signal transmitters 72a–72d for respectively transmitting one of the corresponding optical label signals 77a–77d carrying the control information necessary for the routing of the optical signal.

The routing device 80 is connected respectively to each communication nodes 100a–100d through the corresponding optical transmission lines 81a–81d and comprises wavelength demultiplexers 74 for separating the optical signals and the optical label signals, optical receivers 78e for receiving the optical label signals separated by the wavelength multiplexers 74, optical splitters 79 for branching the optical signals separated by the wavelength demultiplexers 74 to a plurality of optical paths and a plurality of optical gates 75a–75d for selecting the optical path by the routing processing for passing or intercepting the optical signals according to the control information in the optical label signals 77a–77d respectively connected to a plurality of the corresponding optical paths. The control circuit section for controlling the optical gates 75a–75d are not shown in the figure.

When the optical signals 76a–76d and the optical label signals 77a–77d respectively including the control routing information of the optical signals are fed respectively to the router 80 through the optical transmission lines 81a–81d after being transmitted respectively from a plurality of communication nodes 100a–100d (the four communication nodes #1–#4 in the case shown in the figure), the optical signals 76a–76d and the optical label signals 77a–77d are respectively separated by the wavelength demultiplexers 74 provided in the router 80 respectively corresponding to the communication nodes.

Further, the optical signals 76a–76d are respectively branched by the optical splitter 79 in the stage following the wavelength demultiplexer 74 and respectively introduced into the corresponding optical gates (three optical gates among the optical gates 75a–75d in the case shown in the figure) through a plurality of optical paths of substantially the same length (three optical paths in the case shown in the figure). On the other hand, the optical label signals 77a–77d are respectively guided to the corresponding optical receivers 78e. Next, when the optical signal passes one or a plurality of optical gates among a plurality of optical gates 75a–75d, which is or are designed to be driven according to the information carried by the optical label signal received by the optical receiver 78e, the optical path for the optical signal is selected from among the optical paths 82a–82d.

The time required for the optical signal 76 (the representative number of 76a–76d) to arrive at the optical gate 75 (the representative number of 75a–75d) from the input port of the wavelength demultiplexer 74 of the router 80 is given as t1; the time required for the optical label signal 77 (the representative number of 77a–77d) corresponding to the optical signal 76 to arrive at the optical receiver 78e from the input port of the wavelength demultiplexer 74 is given as t2; the time required for the optical receiver 78e to drive the optical gate 75 (to permit the optical signal to pass) after completing the reception of the optical label signal 77. Under these conditions, in the optical gate 75, in order for the optical signal 76 to be processed for proper gating, it is necessary for each of the communication nodes 100 (the representative number of 100a–100d) to output both the optical signal 76 and the optical label signal 77 respectively with a time lag so that the time lag becomes equal to the relative time lag T' (the time lag between the front of the optical signal 76 and the end of optical label signal 77 arrived at the input port of the wavelength demultiplexer 74, denoted by numeral 90 in FIG. 5) to satisfy the inequality (1) given below.

$$T' > t2 + t3 - t1 \qquad (1)$$

On the other hand, in order to raise the data communication efficiency among the communication nodes 100, as shown in FIG. 6, it is necessary to adjust the relative time lag T' in the above inequality (1) so that the time lag Δt (denoted by numeral 91) between the arrival time of the optical signal 76 at the optical gates 75 to drive the optical gates 75 and the time (denoted by numeral 92) at which the optical signal is allowed to pass is reduced as far as possible.

By predetermining the values of t1, t2 and t3 in the above inequality (1), the relative time lag T' between the optical signal 76 and the optical label signal 77, which is necessary for proper gating of the optical signal 76 by the optical gate 75, can be determined.

However, in general, in the case of the optical communication system by using the optical label signal, for the easy separation of the optical signal and the optical label signal by the router 80, these signals have different wavelengths. Therefore, the relative time lag between the optical signal and the optical label signal varies according to transmission distance due to the effect of the wavelength dispersion of the optical fiber which is a transmission medium of the optical signal. In consequence, the time lag T between the transmission of the optical signal and that of the optical label signal set by the communication node 100 differs from the relative time lag T' at immediately before the input port of the wavelength demultiplexer 74 of the router 80. Since the distances from various communication nodes 100 to the router 80 vary, it is necessary to adjust the transmission time lag T between the transmission of the optical signal and that of the optical label signal so that the relative time lag T' for each of the communication nodes 100 satisfies the above inequality (1).

However, since the router and each communication node are, in general, arranged at physically separated locations, when setting the previously mentioned transmission time lag T at each communication node, it is necessary to adjust in real-time conjunction so that the data is transmitted properly to each communication node, but this process is very cumbersome in the case of the conventional system.

SUMMARY OF THE INVENTION

The present invention has been made in consideration of the problems of the related arts, and from a new viewpoint that is not expected in the conventional methods.

Thus, it is the first object of the present invention concerning the first embodiment of the present invention to provide an optical communication device capable of resolving the previously mentioned problem of the conventional wavelength routing by drastically reducing the number of optical sources necessary for each communication node by providing shared optical sources to be shared among a plurality of communication nodes so that the number of required optical sources in each of the communication nodes is reduced and each of the communication nodes is not required to be provided with its own optical source having the wavelength strictly adjusted for data transmission.

Further, another object relating to the first embodiment of the present invention is to provide an optical communication device capable of forming a simple system not requiring each communication node to be provided with its own optical sources having its wavelength strictly adjusted for data transmission.

In order to achieve the above object, a multi-wavelength optical source equipment employed for an optical network system with a plurality of communication nodes connected with one another by a wavelength routing method and for converting the wavelength of the optical signals to desired wavelengths so as to transmit to desired communication nodes, the optical signals carrying the control information concerning the routing of the signals from each of the communication nodes, comprising: first optical splitters for branching the optical signals transmitted from each of the communication nodes to a first optical path and a second optical path; optical receivers for receiving the optical signals that have passed the first optical path; second optical splitters for branching the optical signals that have passed the second optical path to a plurality of optical paths; a plurality of optical gates for passing or intercepting the optical signals branched by the second splitters; wavelength converters for converting the wavelength of the optical signals outputted from the optical gates into desired wavelengths; a controller for controlling optical gates according to the control information relating to the routing of the optical signals received by the optical receivers; optical delay devices for adjusting the optical path length so that the optical signals that have passed the second optical path will not enter the optical gates before the optical gates are driven by the controller; multi-wavelengths optical sources for supplying the light having desired wavelength to each of the wavelength converters; and wavelength multiplexers for multiplexing the optical signals whose wavelengths have been converted by the wavelength converters.

It is the second object of the present invention concerning the second embodiment of the present invention to provide an optical communication system and an optical communication method for enabling individual communication nodes to self-supportingly adjust the transmission time lag T between the optical signal and the optical label signal for the optical signal so as to prevent the loss of the part or all of the optical signal by way of each optical signal transmitted from each communication node to pass the optical gates of the router by inappropriate timing, thereby realizing a marked reduction of work load relating to the setting of the transmission time lag T at each communication node.

In order to achieve this object, according to the present invention, an optical communication equipment comprising: a plurality of communication nodes having an optical signal transmitter for transmitting the optical signals and an optical label signal transmitter for transmitting the optical label signals carrying the control information concerning the routing of the optical signals respectively, for transmitting the optical signals and the corresponding optical label signals giving a relative transmission time lag; a router having wavelength demultiplexers connected to each of the communication nodes through the optical transmission line for separating the optical signals from the optical label signals, optical label signal receivers for receiving the optical label signals separated by one of the wavelength demultiplexers, optical splitters for branching the optical signals separated by one of the wavelength demultiplexers to a plurality of optical paths of a substantially the same length, a plurality of optical gates for routing by passing or intercepting the optical signal with respect to a corresponding optical path of the a plurality of optical paths according to the information carried by the optical label signal received by one of the optical label signal receivers; each of the communication nodes comprises: an optical signal transmission means for transmitting the optical signals addressed to the communication node that transmitted it through the optical transmitter; an optical label signal transmission means for transmitting the optical label signal carrying the routing information of the optical signal through the optical label signal transmitter; an optical receiver for receiving the optical signal addressed to the communication node that transmitted it and returned through the router; a diagnosing means for diagnosing the optical signal received by the optical receiver; and an adjusting means for adjusting the transmission time lag between the optical signal and the optical label signal according to the result of the diagnosis by the diagnosing means.

In order to achieve the second object, according to the present invention, an optical communication method for optical communication by using the a plurality of communication nodes for transmitting the optical signal and optical label signal with relative transmission time lag and an optical router for passing or intercepting the optical signal according to the control information carried by the optical label signal, comprising the steps of: transmitting from each communication node an optical signal addressed to the communication node that transmitted it and the corresponding optical label signal giving a relative transmission time lag; receiving from each communication node the optical signal addressed to the communication node that transmitted it through the router; testing whether the optical signal addressed to the communication node that transmitted it has been received without an error or not; and setting the transmission time lag between the optical signal addressed to the communication node that transmitted it and the corresponding optical label signal according to the result of the test so that the optical signal addressed to the communication node that transmitted it is received without an error, and the transmission time lag set in this way is set as the transmission time lag between the optical signal and the corresponding optical label signal with respect to the corresponding communication node.

In the network system according to the first embodiment of the present invention where a plurality of communication nodes are connected by means of the wavelength routing method, multi-wavelength optical source equipment, having shared multi-wavelength optical sources and a wavelength conversion function, is provided between each the communication node and the wavelength router and is shared by each communication node.

With this arrangement, in the case of the first embodiment of the present invention, the wavelength of the optical signals transmitted from each communication node can be converted into the wavelengths adapted for routing to desired communication nodes by using the light provided from the shared multi-wavelength optical sources, whereby for a plurality of communication nodes interconnected by the wavelength routing system, the number of the optical sources for the data transmission provided for each communication node, which results in the building of a low-cost system.

Further, in the first embodiment of the present invention, the wavelength of the principal optical signals transmitted from each communication node are converted into the wavelengths necessary for the wavelength routing by the multi-wavelength optical source equipment, so that it is not necessary to provide optical sources having strictly defined wavelength for each communication node, thereby making easier the system configuration.

Further in the first embodiment of the present invention, though the transmission bit rate of the data increases, it is possible to reduce the load of the electrical processing for reading the routing information of the data by transmitting the routing information of the data with a low bit-rate optical signal having the wavelength differing from the data signal.

Further, in the case of the first embodiment of the present invention, the status information of data transmissions from the communication nodes can be converged to the multi-wavelength optical source equipment, so that the control of the network can be made easier.

According to the second embodiment of the present invention, each of the a plurality of nodes sends out the optical signal (optical signal addressed to the communication node that transmitted it) and the corresponding optical label signal to the router; the optical signal addressed to the communication node that transmitted it is made to pass the optical gate of the router according to the control information of the optical label signal and returned to the communication node that transmitted the optical signal; the communication node examines the optical signal addressed to the communication node that transmitted it after receiving the optical signal and adjusts the transmission time lag between the optical signal and the corresponding optical label signal so that the optical signal can be received correctly.

By doing so, according to the second embodiment of the present invention, the transmission time lag T between the optical signal and the corresponding optical label signal can be adjusted self-supportingly by each communication node. Therefore, according to the second embodiment of the present invention, even in the case of an optical communication system wherein the optical path length between the router and each communication node differs case by case and the optical signal and optical label signal use different wavelength respectively, the optical signals sent out from each communication node are respectively made to pass the optical gates of the router by proper timing, thereby surely and easily preventing a part or whole of an optical signal from being lost due to the routing processing.

Further, according to the second embodiment of the present invention, the performance for setting the transmission time lag can be made easier and wild reduction for each communication node.

Therefore, the optical packet routing system by using the optical label signals according to the present invention can be expected to be capable of contributing to the development of the optical communication systems such as Metropolitan Area Network (MAN), a communication carrier, Wide Area Network (WAN), those for business enterprises, those for universities such as the campus area networks and the like.

The above and other objects, effects, features and advantages of the present invention will become more apparent from the following description of embodiments thereof taken in conjunction with the accompanying drawings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

FIG. 21 is an illustrative diagram showing the input-output relation of the cyclic-wavelength arrayed-waveguide grating 60;

FIG. 27 is an illustrative diagram showing the input-output relation of the cyclic-wavelength arrayed-waveguide grating 120.

DETAILED DESCRIPTION OF THE PREFERRED EMBODIMENTS

The configurations and operations of optical packet routing network system according to the embodiments of the present invention will be described below with reference to the drawings.

The First Example of Composition of the First Embodiment

Figure 1:
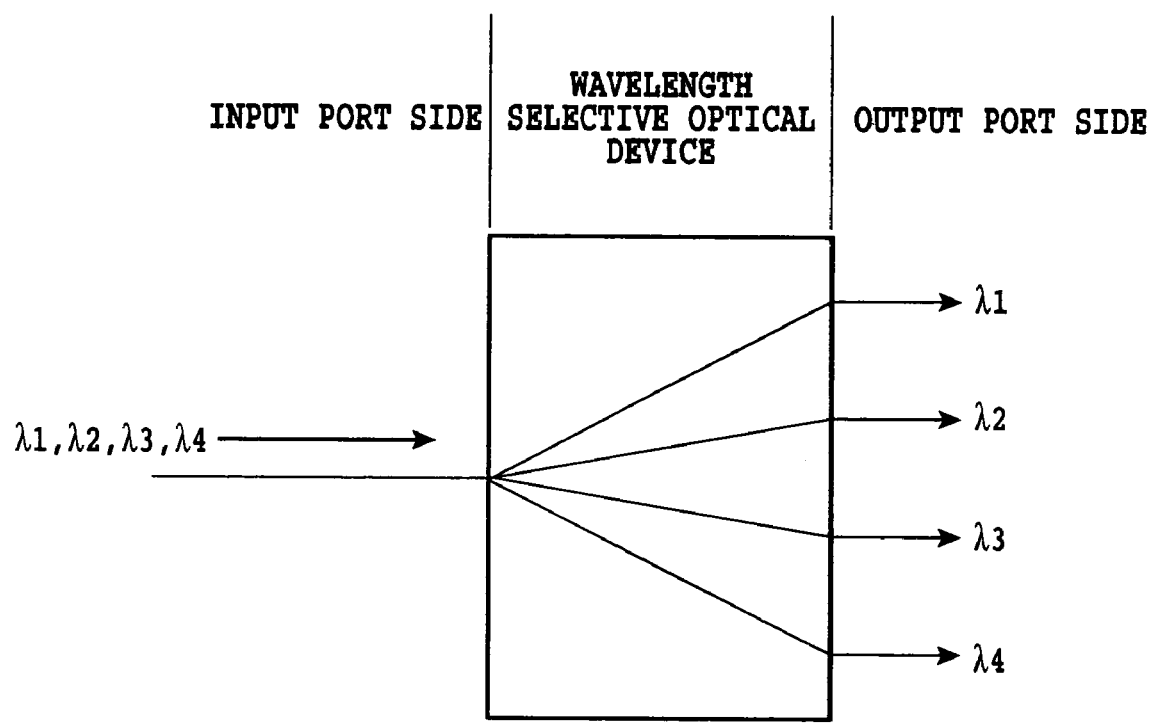
FIG. 1 is a schematic diagram illustrating the wavelength routing by using an optical device having wavelength selectivity.
Figure 2:
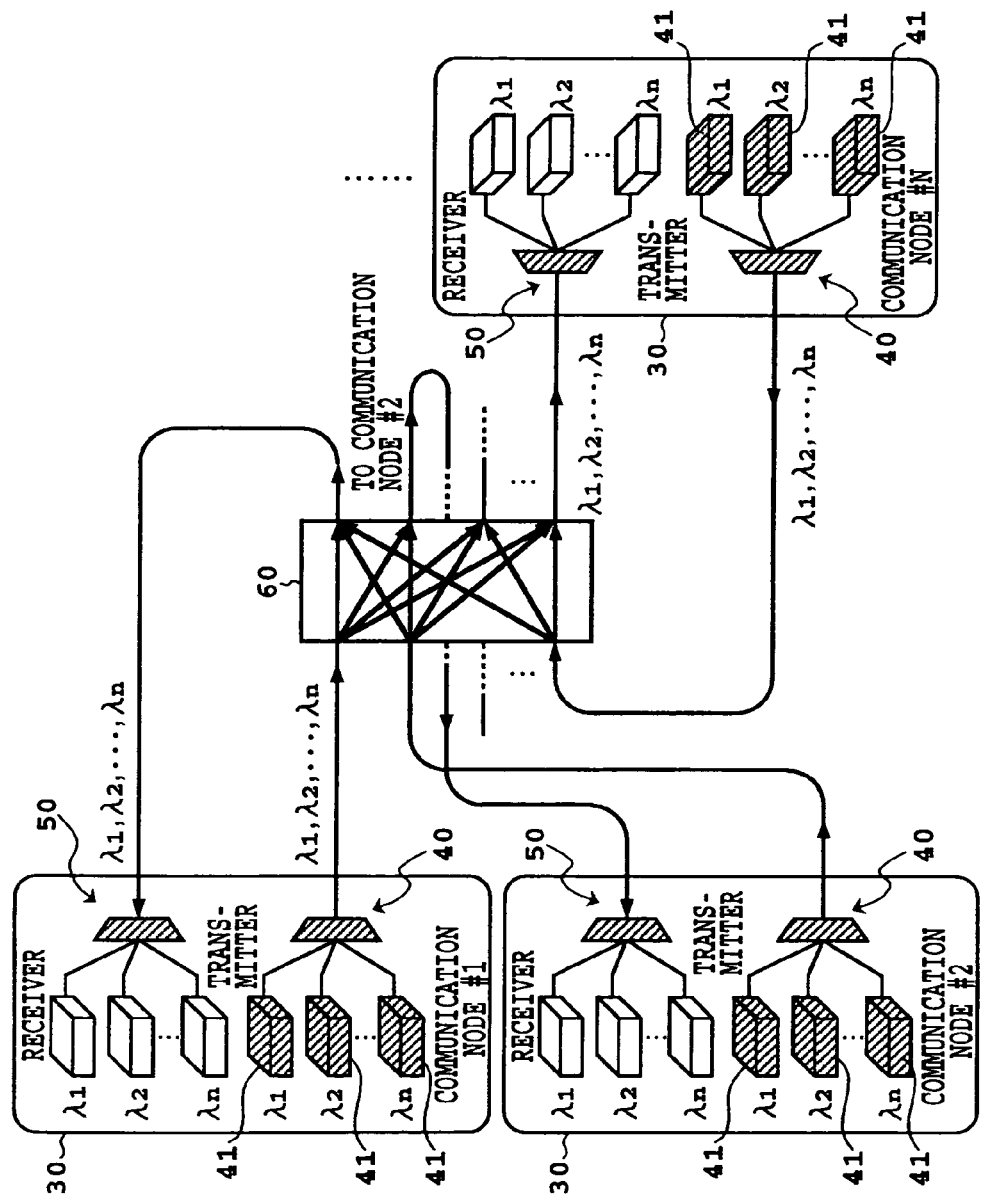
FIG. 2 is a block diagram showing a conventional optical communication system using an arrayed-waveguide grating.
Figure 3:
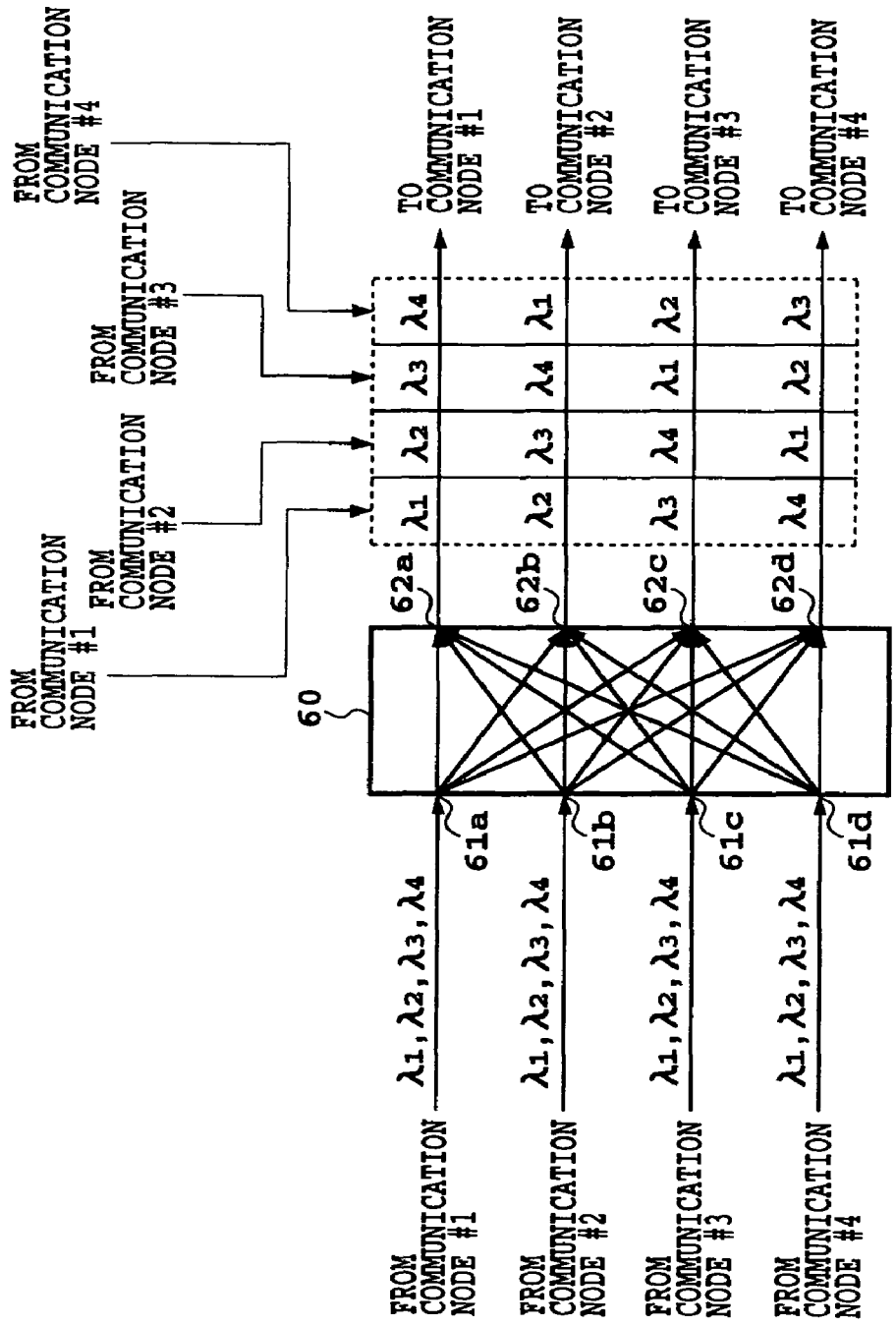
FIG. 3 is a diagram illustrating the wavelength routing processing by an arrayed-waveguide grating.

The basic composition of the first embodiment of the present invention will be described referring to FIGS. 7 and 8. For the parts shared to those of the prior art shown in FIG. 2 with shared numerals and symbols, the descriptions thereof will be omitted here.

(Composition of the System)

Figure 7:
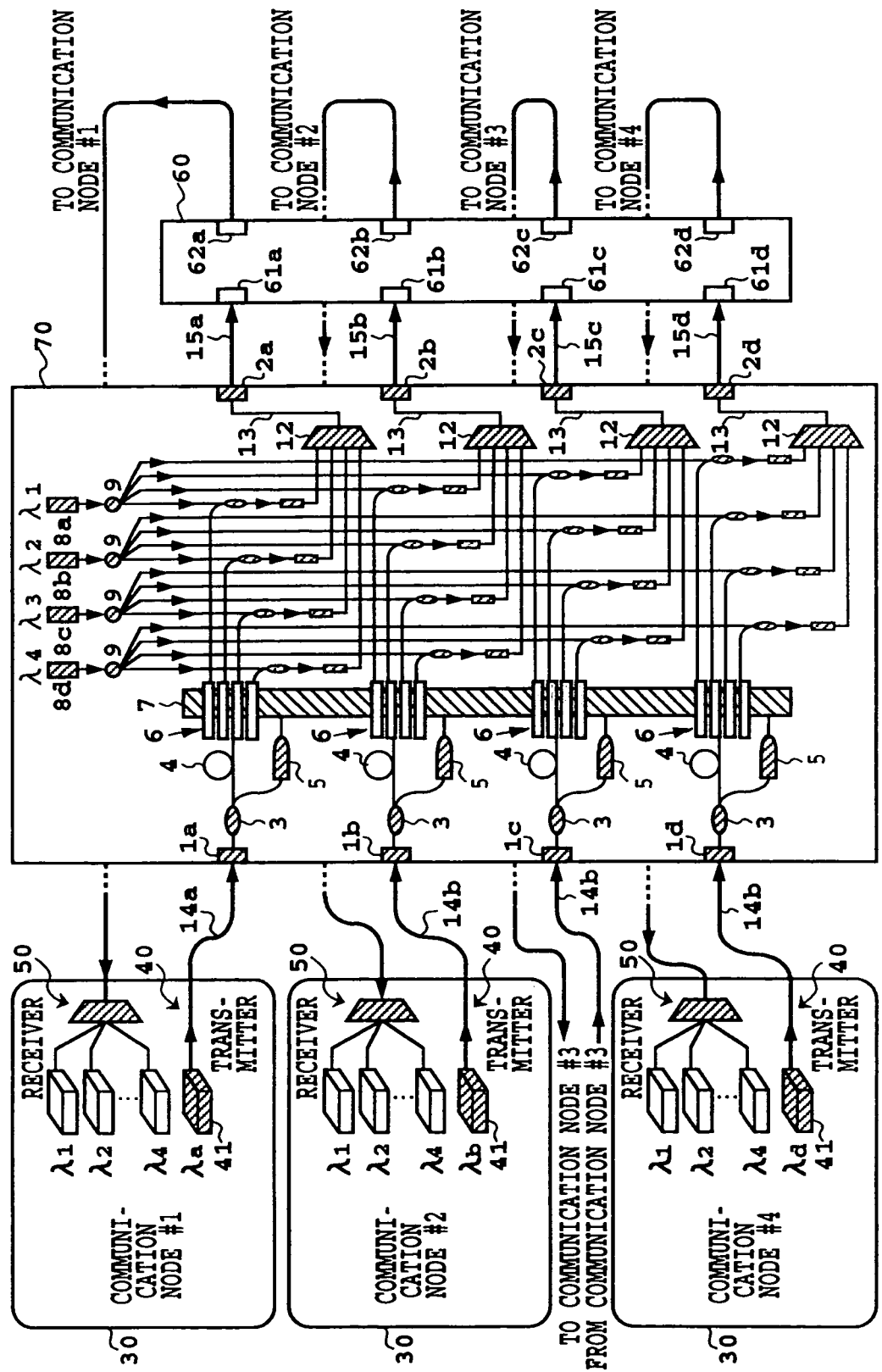
FIG. 7 is a block diagram showing a system comprising the multi-wavelength optical source equipment according to the present invention.

FIG. 7 schematically shows the composition of the network system provided with the multi-wavelength optical source equipment relating to the present invention. The network system comprises N number (4 in the present embodiment) of communication nodes 30 (i.e., communication node #1-communication node #4), multi-wavelength optical source equipment 70 relating to the present invention and the cyclic-wavelength arrayed-waveguide grating 60 having wavelength routing function. Each communication node 30 is provided with transmitter equipment 40 and receiver equipment 50.

The transmitter equipment 40 of the communication node #1 is provided with optical sources 41 for transmitting an optical signal having a single wavelength $\lambda a$. Similarly, the communication node #2 has an optical source 41 for transmitting optical signals having a single wavelength $\lambda b$; the communication node #3 has an optical source 41 for transmitting optical signals having a single wavelength $\lambda c$; the communication node #4 has an optical source 41 for transmitting optical signals having a single wavelength $\lambda d$. These wavelengths, $\lambda a$, $\lambda b$, $\lambda c$ and $\lambda d$ are predetermined.

Multi-wavelength optical source equipment 70 incorporates N number of shared optical sources corresponding to the N number of the communication nodes. Since this embodiment comprises 4 communication nodes, the multi-wavelength optical source equipment 70 incorporates 4 optical sources 8a, 8b, 8c and 8d. Further, the multi-wavelength optical source equipment 70 comprises input ports and output ports respectively the corresponding in number to the number of the communication nodes. In the case of the present embodiment, the multi-wavelength optical source equipment 70 is provided with 4 input ports 1a–1d and 4 output ports 2a–2d. The input ports 1a–1d are connected to the transmitter equipment 40 of the corresponding communication nodes #1–#4 respectively. The output ports 2a–2d are connected to the corresponding input ports 61a–61d of the cyclic-wavelength arrayed-waveguide grating 60 respectively.

The output ports 62a–62d of the cyclic-wavelength arrayed-waveguide grating 60 are connected to the receiver equipment 50 of the corresponding communication nodes #1–#4.

Multi-Wavelength Optical Source Equipment

Next, the internal structure of the multi-wave optical source equipment 70 will be described referring to FIG. 8. In this embodiment, 4 input ports and 4 output ports are provided respectively, but the numbers are not necessarily be limited to 4 in the case of the present invention.

Figure 8:
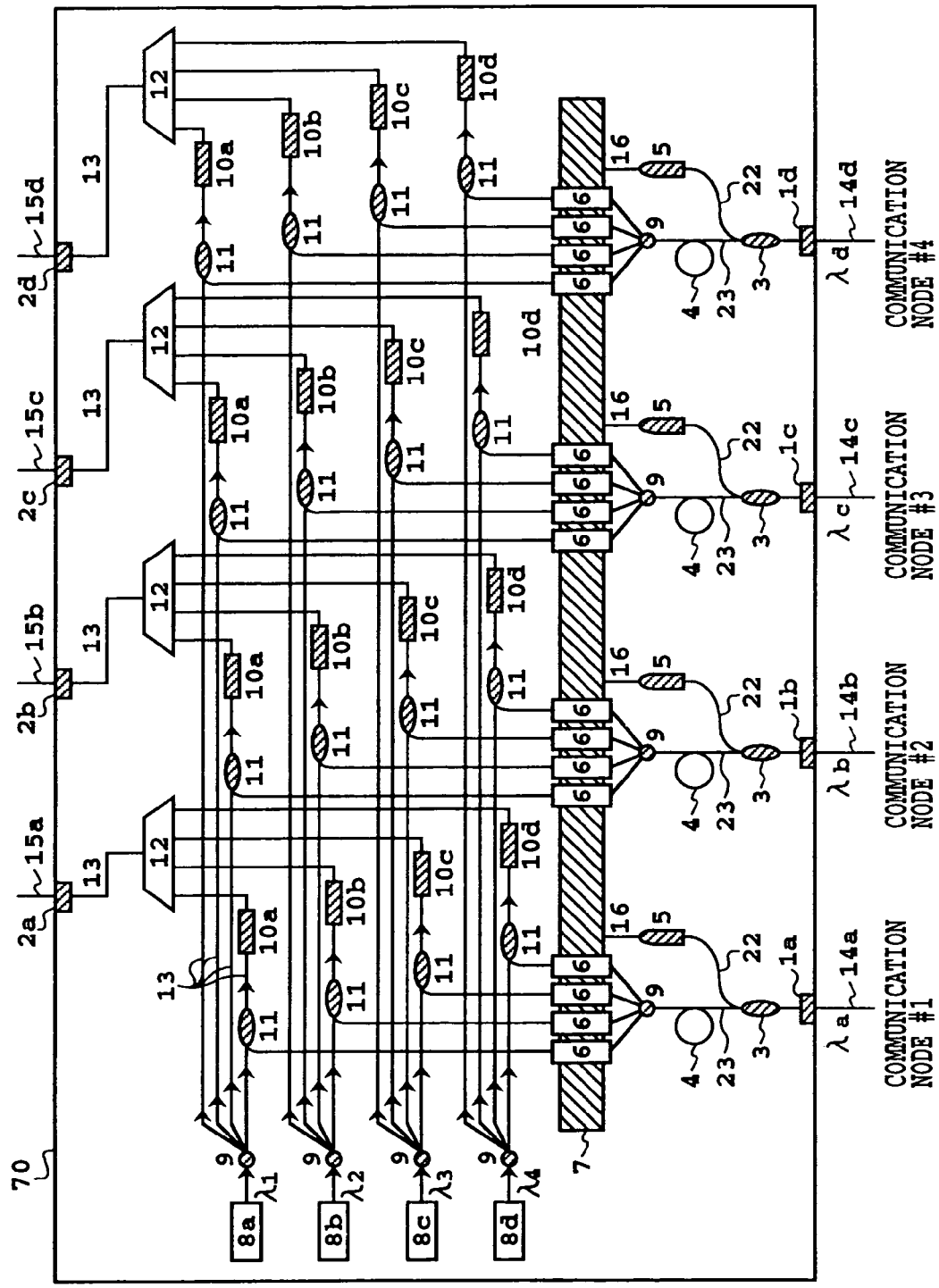
FIG. 8 is a block diagram showing the first example of the composition of the multi-wavelength optical source equipment according to the first embodiment of the present invention.

In FIG. 8, numeral 3 denotes a 1×2 optical splitter comprising 1 input port and 2 output ports. Numerals 4, 5, 6 and 7 denote an optical delay device, an optical receiver, an optical gate and an optical gate control system (controller) respectively.

Numerals 8a–8d are shared optical sources for emitting the optical lights having the wavelengths $\lambda a$, $\lambda b$, $\lambda c$ and $\lambda d$. Numeral 9 denotes a 1×4 optical splitter comprising 1 input port and 4 output ports. Numerals 10a–10d denote wavelength converters. Numerals 11 denotes a wavelength multiplexer comprising 2 input ports and 1 output port. Numerals 12 denotes a wavelength multiplexer comprising 4 input ports and 1 output port.

Numeral 13 denotes an optical line. Numerals 14a–14d denote optical lines connecting individual communication nodes 30 and the individual input ports 1a–1d of the multi-wavelength optical source equipment 70. Numerals

15a–15d are optical lines connecting the output ports 2a–2d of the multi-wavelength optical source equipment 70 and the input ports 61a–61d of the cyclic-wavelength arrayed-waveguide grating 60. Numeral 16 denotes an electric line connecting the optical receiver 5 and the optical gate control system 7.

In the above case, for example, silica glass waveguide type optical splitters may be employed as the optical splitters 3 and 9; an optical fiber type optical delay device, as the optical delay device 4; a device using a semiconductor optical amplifier, as the optical gate 6; distributed feedback type semiconductor lasers, as the shared sources 8a–8d; a device using semiconductor amplifier, as wavelength converters 10a–10d; a silica glass waveguide type wavelength multiplexer, as the wavelength multiplexer 11; an arrayed-waveguide grating, as the wavelength multiplexer 12; an optical fiber, as the optical line 13.

(Operation of Multi-Wavelength Optical Source Equipment)

Next, an explanation will be made as to the operation of the multi-wavelength optical source equipment 70. It will be explained by an example how the optical signal S12 addressed to the communication node #2, sent out from the communication node #1 connected with the input port 1a is transmitted to the communication node #2.

The optical signal S12 sent out from the communication node #1 to the communication node #2 is fed to the input port 1a of the multi-wavelength optical source equipment 70. This optical signal is composed of a data component and a control component for employed selecting the optical gates and the like to direct the designation communication node, both the components having an identical wavelength λa.

The control component of the optical signal is designated as the optical label signal.

The optical signal fed to the input port 1a is branched to the first optical path 22 and the second optical path 23 by means of the optical splitter 3. The optical signal branched to the first optical path is guided to the optical receiver 5 that is connected with the control system 7. On the other hand, the optical signal branched to the second optical path is guided to each of the four optical gates 6 through an optical fiber type optical delay device 4 and the optical splitter 9.

The control information contained in the control component of the optical signal received by the optical receiver 5 is analyzed by the control system 7. According to the result of analysis, the control system 7 outputs the control signal for the gate selection to the optical gates 6. One or plural optical gate(s) 6 are selected according to the control signal (i.e., the control component for the selection of optical gates) from the control system 7, and the optical signal is outputted from the output port of one or plural selected optical gate(s) 6.

Individual output ports of the optical gates 6 are respectively connected to the corresponding wavelength converters 10a, 10b, 10c and 10d through the wavelength multiplexers 11. The optical signal outputted from the output port of one or plural selected optical gate(s) is fed to the input port of the wavelength converter 10i (i represents any one of a, b, c and d) connected to the selected optical gate 6. The light having one of the wavelengths (λ1–λ4) is supplied to the wavelength converter 10i from the multi-wavelength optical source 8j (j represents any one of a, b, c, and d, and i=j) through the optical fiber and the wavelength multiplexer 11. The wavelength converter 10i converts the wavelength of the inputted optical signal into the wavelength (i.e., wavelength λ12, provided that the wavelength may be any one of λ1–λ4) for the routing to the addressed communication node #2.

The optical signal whose wavelength is converted into λ12 by the wavelength converter 10i is guided to one of the input ports 61a–61d (Refer to FIG. 7) of the cyclic-wavelength arrayed-waveguide grating 60 connected to the output ports 2a–2d of the multi-wavelength optical source equipment 70. With the cyclic-wavelength arrayed-waveguide grating 60, the output port leading to the communication node 30 is selected which is specified by the control component of the optical signal according to the wavelength λ12 of the optical signal by means of the wavelength routing as is described in connection with the prior art. In the case of the present embodiment, the output port leading to the communication node #2 is selected. In this way, the optical signal is routed by the cyclic-wavelength arrayed-waveguide grating 60 so as to be received by the addressed communication node #2.

Similarly, the wavelength of an optical signal transmitted from any communication node 30 to one or plural desired communication node(s) is converted into one or plural wavelength(s) by means of the multi-wavelength optical source equipment 70 according to the present invention in response to the control component of the optical signal and the optical signal is made to be received by one or plural addressed communication node(s) 30 by means of the cyclic-wavelength arrayed-waveguide grating 60 having the wavelength routing function.

As discussed above, the multi-wavelength optical source equipment 70 according to the present invention is provided with shared multi-wavelength optical sources 8a–8d, which can be shared among the communication nodes 30 (communication nodes #1–#4) and give the light with appropriate wavelengths necessary for the wavelength routing to the wavelength converters 10a–10d from these optical sources 8a–8d and providing to each communication nodes 30. Therefore, eight optical sources in total, that is, the four optical sources in the communication nodes 30 and another four optical sources in the multi-wavelength optical source equipment 70, is sufficient for this optical network system.

The total number of the optical sources required for the example optical network system can be expressed generally as N+N (=2N), the sum of the number N for the communication nodes 30 and the number N for the multi-wavelength optical source equipment 70, while the same in the case of the prior art is N×N (=N$^2$). In consequence, in the case of the present invention, the number of optical sources required by each communication node can be reduced largely, and the effect of such reduction become larger as the number of the communication nodes constituting the optical network increases.

Further, since the wavelengths (λa–λd) of the optical sources 41 for employed transmitting, provided in individual communication nodes 30 are converted into those of the optical sources 8a–8d by means of the wavelength converters 10a–10d, the wavelengths of the optical sources 41 are not necessarily required to be strictly controlled wavelengths. Therefore, the work load for setting the wavelength of each of the communication nodes 30 can be reduced.

Concerning the present embodiment, the explanation has been made as to the examples of the case in which the silica glass optical waveguide type optical splitter is employed as the optical splitters 3 and 9, but the optical splitter consisting of the optical fiber or the polymer material may be used. Further, the example of the case in which the optical fiber is used as the optical delay device 4, but the optical delay device 4 may consist of a planar lightwave circuit. Further, an example of the case in which the silica glass optical waveguide type wavelength multiplexer is employed as the wavelength multiplexer 11 has been explained, but the wavelength multiplexer may be of the optical fiber. Further, an example of the case in which the cyclic-wavelength arrayed-waveguide grating is employed as the wavelength multiplexer 12 was explained, but the wavelength multiplexer may be of the dielectric multilayer or one composed of the fiber grating and circulator. Further, the Fabry-Perot semiconductor laser may be employed as the optical source 41 to be provided for each communication node. Further, the elements for the multi-wavelength optical source equipment 70 are not necessarily limited to those described above as long as equivalent function is available.

(Effectiveness)

As explained in the foregoing, according to the first embodiment of the present invention, in a network system comprising a plurality of communication nodes which are connected with one another by the wavelength routing method, since a multi-wavelength optical source equipment comprises shared multi-wavelength optical sources to be shared among individual communication nodes and wavelength conversion function provided between each communication node and each wavelength router, the wavelength of the optical signal transmitted from each communication node can be converted into the wavelength adapted for the routing to the desired communication node by the output lights from the shard multi-wavelength optical sources, whereby, in consequence, the number of optical sources employed for data transmitting to be provided for each of the plural communication nodes, which are connected with one another by the wavelength routing method, can be reduced largely for the building of a low-cost system.

Further, since the multi-wavelength optical source equipment having the shared multi-wavelength optical sources to be shared among individual communication nodes is provided, the wavelength of the principal optical signal transmitted from each communication node is converted into the wavelength adapted for the wavelength routing by the multi-wavelength optical source equipment, so that it is not necessary to allocate the optical sources having a strictly defined wavelength for data transmission, thereby making the composition of the system easier.

Further, since the multi-wavelength optical source equipment comprising the shared multi-wavelength optical sources to be shared among the individual communication nodes, though the transmission bit-rate of the data increases, it is possible to reduce the load of the electrical processing for reading the routing information of the data by transmitting the routing information of the data with a low bit-rate optical signal having the wavelength differing from the data signal.

Furthermore, since the multi-wavelength optical source equipment comprising the shared multi-wavelength optical sources to be shared among individual communication nodes, the status information of data transmissions from the communication nodes can be converged to the multi-wavelength optical source equipment, so that the control of the network can be made easier.

Composition Example 2 of the First Embodiment

Next, the composition example 2 of the first embodiment of the present invention will be explained referring to FIG. 9. The parts of this composition shared to those of the basic composition shown in FIGS. 7 and 8 are given shared numerals and symbols and the explanation thereof are omitted here.

This example is a variation of the basic composition shown in FIG. 8. In the case of the multi-wavelength optical source equipment 70 shown in the FIG. 8, the output ports of the optical splitter 9 for branching the optical signal passing the second optical path 23 to a plurality of optical paths are respectively connected to the optical gates 6.

Figure 9:
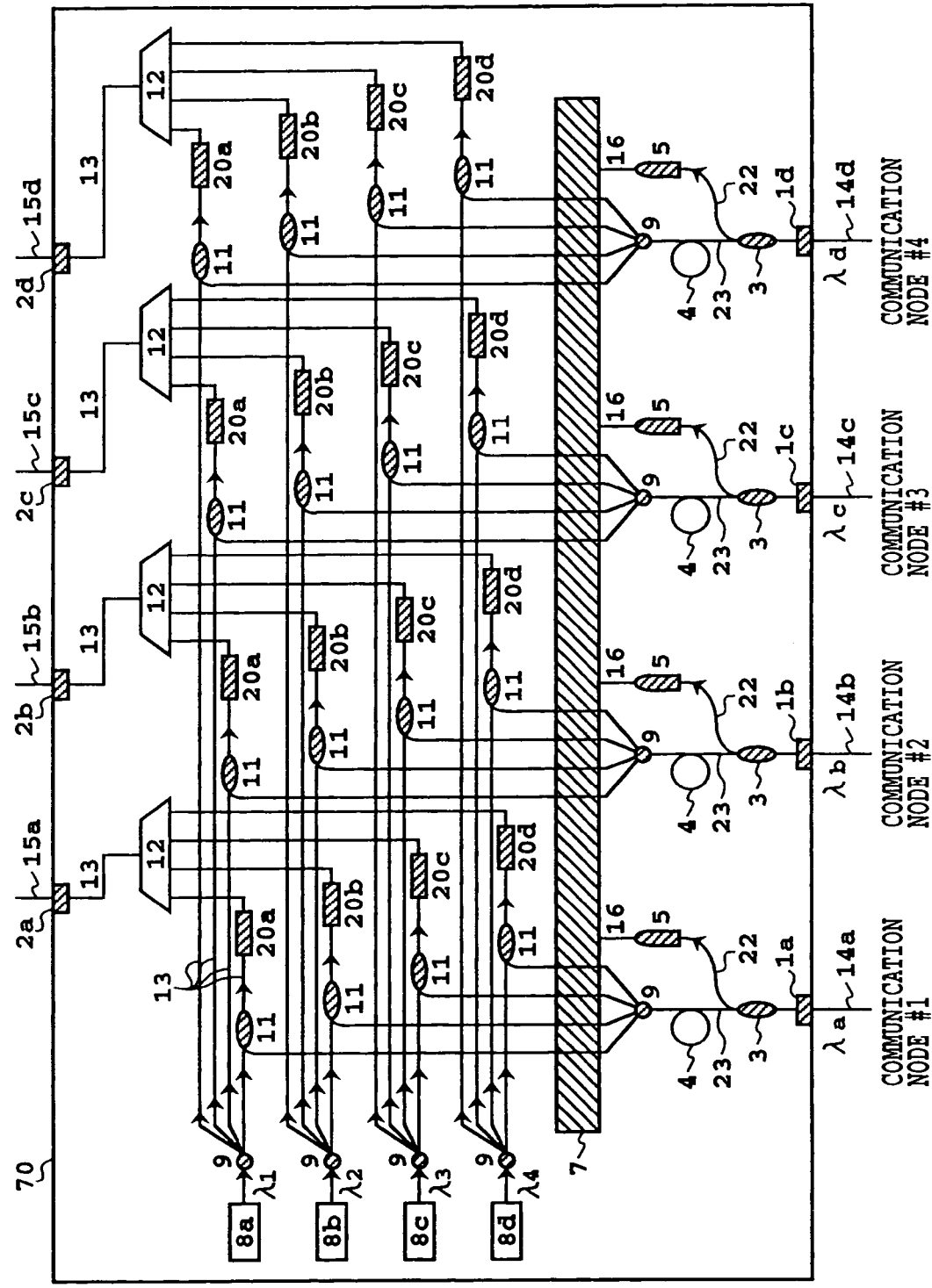
FIG. 9 is a block diagram showing the second example of the composition of the multi-wavelength optical source equipment according to the first embodiment of the present invention.

In contrast, in the case of the present embodiment, as shown in FIG. 9, wavelength converters 20a–20d, having optical gate function respectively, are respectively connected between each pair of the wavelength multiplexer 11 and the wavelength multiplexer 12, located respectively in the stage following the each output port of the optical splitter 9, to form the multi-wavelength optical source equipment 70. Each of the wavelength converters 20a–20d including the optical gate function, has both the optical gate function for passing or intercepting the optical signal outputted from the output port of the optical splitter 9 and the wavelength conversion function for converting the wavelength of the optical signal into a desired wavelength.

Next, an explanation will be made as to the optical gate function of the wavelength converters 20a–20d including optical gate function. The control information, for selecting one or plural of the optical gate(s), included in the optical signal is guided for analysis to the control system 7 through the optical receiver 5 so that the control system 7 outputs the control signal for the selection of the optical gates to the corresponding wavelength converters 20a–20d including optical gate function according to the result of the analysis. However, in FIG. 9, the electric lines for the control signal between the control system 7 and each of the wavelength converters 20a–20d including optical gate function, is omitted for avoiding the complication of the diagram.

Concerning the wavelength converters 20a–20d including optical gate function, the wavelength converter 20i (i represents any one of a, b, c and d) corresponding to the addressed communication node is selected according to the control information. And the optical signal is outputted from the output port of the selected wavelength converter 20i.

The wavelength converters 20a–20d with the optical gate function can be used as the substitutes for the optical gates 6 and the wavelength converters 10a–10d shown in FIG. 8, so that the number of parts can be reduced further.

Composition Example 3 of the First Embodiment

Figure 10:
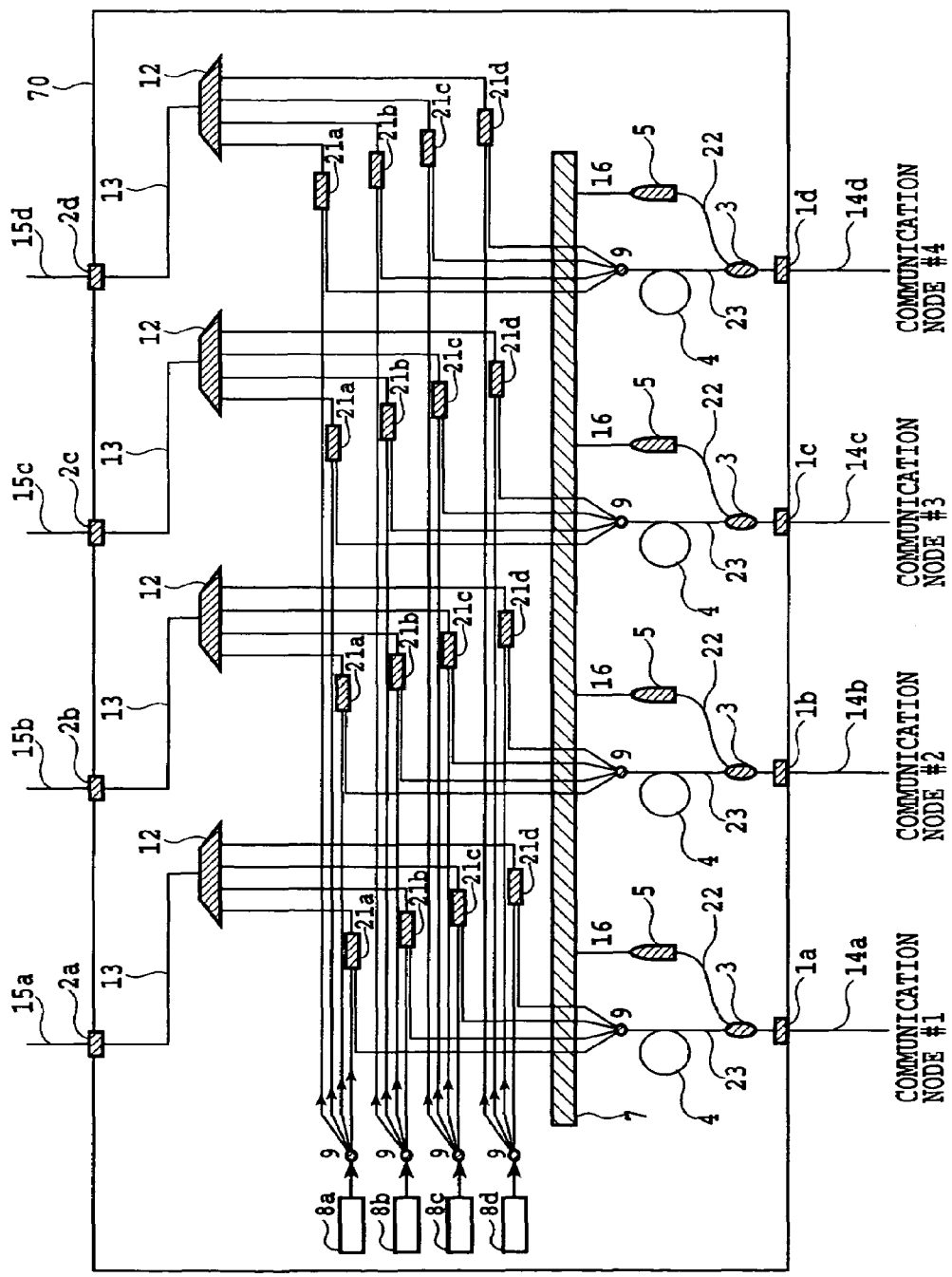
FIG. 10 is a block diagram showing the third example of the composition of the multi-wavelength optical source equipment according to the first embodiment of the present invention.

Next, the composition example 3 of the first embodiment of the present invention will be explained referring to FIG. 10. The parts shared to those explained in FIGS. 8 and 9 are given shared numerals and symbols and the explanation thereof are omitted here.

This example is a variation of the basic composition shown in FIG. 9. In the case of the multi-wavelength optical source equipment 70 shown in FIG. 9, one of the wavelength converters 20a–20d, having the optical gate function respectively, is interposed for connecting each pair of wavelength multiplexing path 11 and the wavelength multiplexer 12, which are located respectively in the stage following one of the output ports of the optical splitter 9 for branching the optical signal passing the second optical path 23 to a plurality of optical paths. On the other hand, in the case of the present example, as shown in FIG. 10, each of the wavelength converters 21a–21d incorporating an optical gate is connected to the following stage of each of the output ports of each optical splitter 9 to form the multi-wavelength optical source equipment 70. Each of the wavelength converters 21a–21d incorporating the optical gate has both the wavelength conversion function for converting the wavelength of the optical signal outputted from the output port of the optical splitter 9 into a desired wavelength and an optical gate for passing or intercepting the optical signal in the device.

Figure 11:
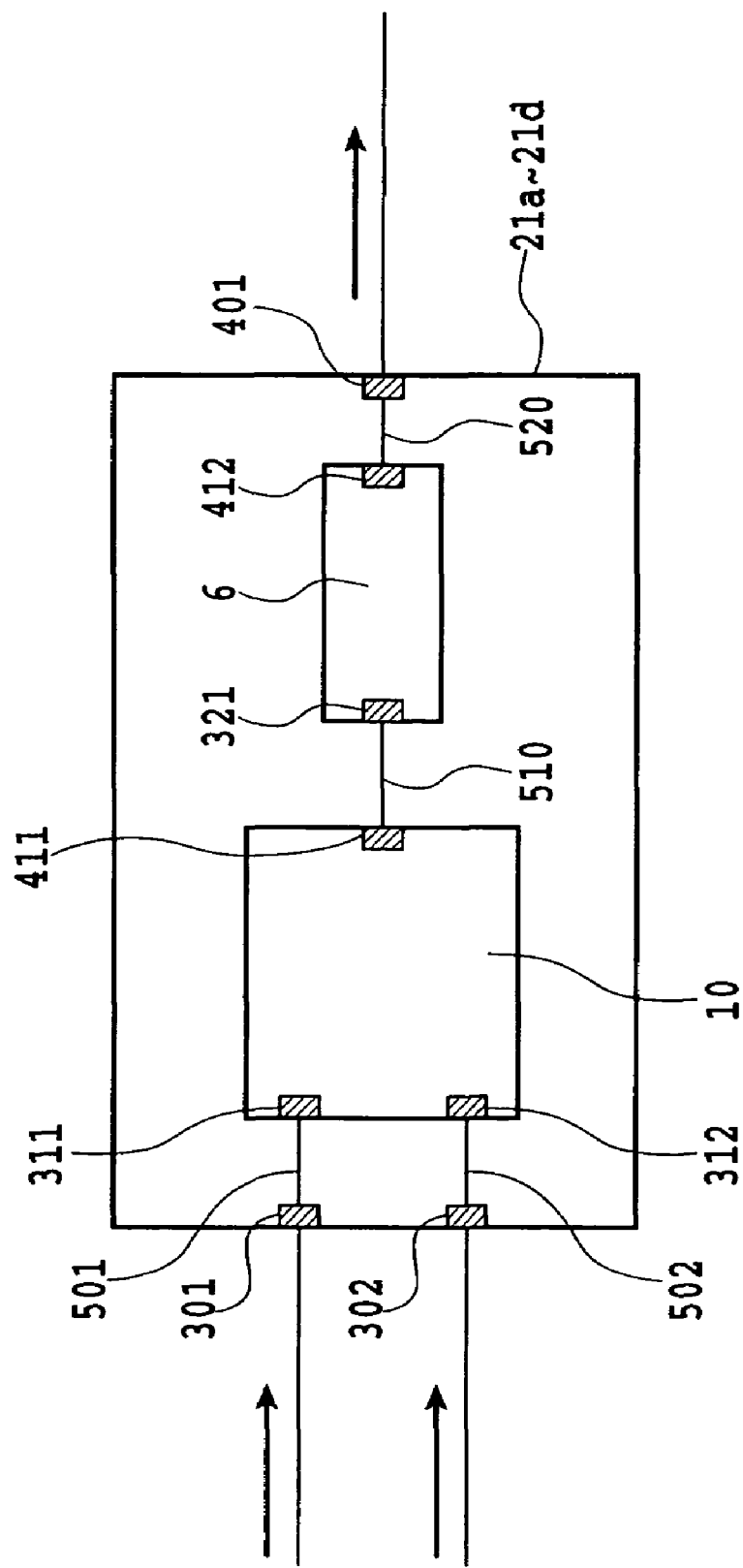
FIG. 11 is a schematic diagram showing the internal structure of the wavelength converter with a built-in optical gate constituting the multi-wavelength optical source equipment.

FIG. 11 shows the internal structure of each of the wavelength converters 21a–21d incorporating an optical gate respectively. In FIG. 11, Numerals 301 and 302 denotes input ports of the wavelength converters 21a–21d respectively incorporating an optical gate; Numerals 311 and 312, input ports of the wavelength converter 10 (the representative number of 10a–10d); Numeral 321, an input port of the optical gate 6; Numeral 411, an output of the wavelength converter 10; Numeral 412, an output port of the optical gate 6; Numeral 401, an output port of the wavelength converter incorporating an optical gate; Numerals 501, 502, 510 and 520, optical lines.

The input port 301 of the wavelength converter incorporating an optical gate receives the input light from any one of the shared optical sources 8a–8d, while the input port 302 receives the optical signal that has passed the optical splitter 9.

The output port 411 of each of the wavelength converters 10a–10d outputs the optical signal whose wavelength has been converted into the wavelength of the shared optical source. That is, when the wavelengths of the shared optical sources 8a–8d are given as λa, λb, λc and λd, the wavelength converter 10 connected to the shared optical source 8a outputs a signal whose wavelength has been converted into the wavelength λa; the wavelength converter 10 connected to the shared optical source 8b outputs a signal whose wavelength converted into the wavelength λb; the wavelength converter 10 connected to the shared optical source 8c outputs a signal whose wavelength converted into λc; the wavelength converter 10 connected to the shared optical source 8d outputs a signal whose wavelength converted into λd.

The control information, for selecting one or plural optical gate(s), included in the optical signal is led, through the optical receiver 5, to the control system 7 for analysis, and the control system 7 outputs the control signal for the selection of the optical gates to one of the wavelength converters incorporating optical gates 21a–21d according to the result of the analysis. However, in FIG. 10, the lines for control signal between the control system 7 and each of the wavelength converters 21a–21d incorporating an optical gate respectively is omitted for avoiding the complication of the diagram.

The optical signal passed the optical splitter 9 is fed to the input port 302 of the wavelength converter 21 (the representative number of 21a–21d) incorporating an optical gate and outputted from the output port 401 of the wavelength converter 21 incorporating an optical gate after undergoing the wavelength conversion by the wavelength converter 10 for being output from its output port 411 and subsequent input to the optical gate 6 and passing the output port 412 of the optical gate 6 whose state is open. The optical signal outputted from the output port 401 passes the wavelength multiplexer 12 and routed to the destination communication node by means of the wavelength routing by the cyclic-wavelength arrayed-waveguide grating.

Composition Example 4 of the First Embodiment

Figure 12:
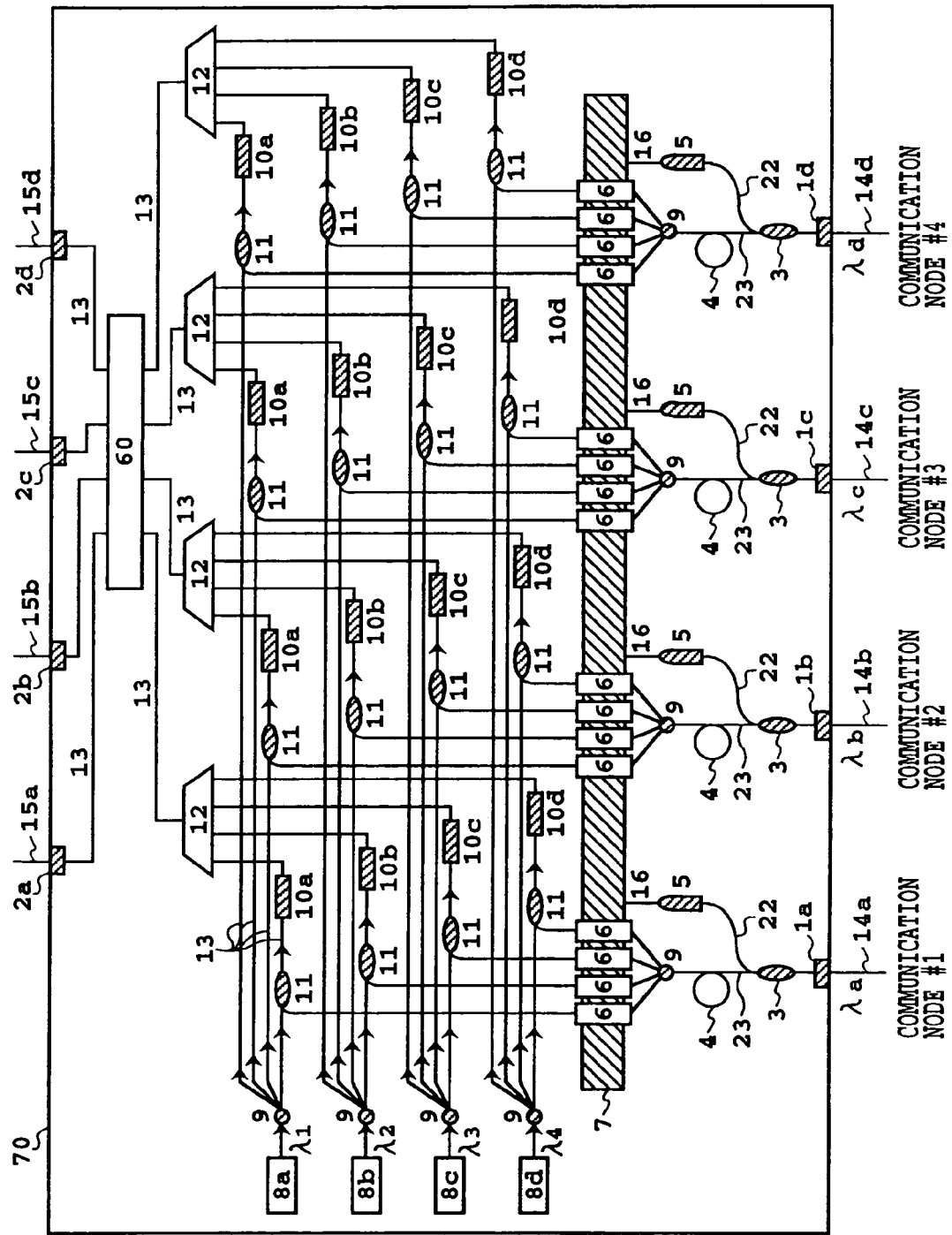
FIG. 12 is a block diagram showing the fourth example of the composition of the multi-wavelength optical source equipment according to the first embodiment of the present invention.

Next, the composition example 4 of the first embodiment of the present invention will be explained referring to FIG. 12. The parts shared to those of the previous example are given shared numerals and symbols and the explanation thereof is omitted.

This example is a variation of the basic composition shown in FIG. 8. That is, the multi-wavelength optical source equipment 70 incorporates the cyclic-wavelength arrayed-waveguide grating 60 as an optical component having the wavelength routing function.

In the cases of various composition examples including the first embodiment of the present example, the cyclic-wavelength arrayed-waveguide grating 60 is employed as an optical component having the wavelength routing function, but the components other than this component may be used as long as the latter have the functions equivalent to that of the former.

Composition Example 5 of the First Embodiment

Figure 13:
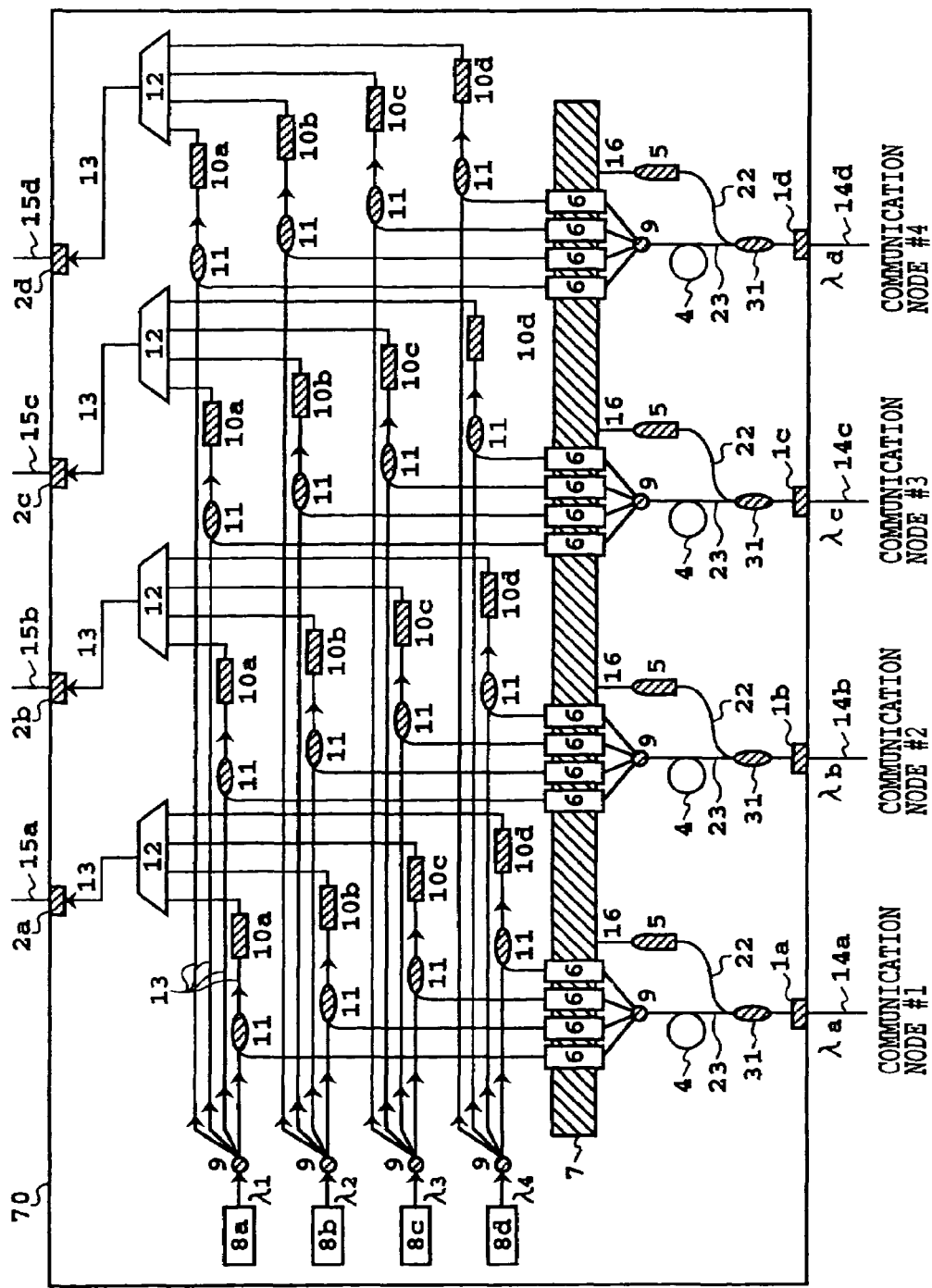
FIG. 13 is a block diagram showing the fifth example of the composition of the multi-wavelength optical source equipment according to the first embodiment of the present invention.

Next, composition example 5 of the first embodiment of the present invention will be explained referring to FIG. 13. The parts shared to those of previous examples are given shared numerals and symbols and the explanation thereof are omitted.

In the case of this example, with the multi-wavelength optical source equipment 70, the principal optical signals transmitted from a communication node 30 are connected with a wavelength demultiplexer 31 for separating the principal optical signal and the control optical signals differing from the principal optical signals in wavelength instead of the optical splitter 3 in the case of the previously mentioned basic composition. For this wavelength demultiplexer 31, a silica glass waveguide type wavelength demultiplexer may be employed. The rest of the composition is similar to the basic composition shown in FIG. 8.

The operation of the multi-wavelength optical source equipment 70 will be explained. It will be explained below giving an example how the principal optical signal addressed to the communication mode #3 sent out from the communication node #1 connected to the input port 1a of the multi-wavelength optical source equipment 70 will reach the destination communication node #3.

The principal optical signal addressed to the communication node #3 and the optical signal for control differing in wavelength from the principal optical signal are transmitted from the communication node #1 to be inputted to the input port 1a of the multi-wavelength optical source equipment 70. The principal optical signal fed to the input port 1a and the control signal to be used for controlling the operation of the multi-wavelength optical source equipment 70 are branched to the first optical path 22 and the second optical path 23 by means of the wavelength demultiplexer 31. The optical signal for control (including the control component for the selection of the optical gate) branched to the first optical path 22 is guided to the optical receiver 5 connected to the control system 7. On the other hand, the principal optical signal (including the data component) branched to the second optical path 23 is guided to the optical gate 6 through the optical fiber type optical delay device 4 and the optical splitter 9.

The optical signal for control received by the optical receiver 5 is analyzed by the control system 7. The control system 7 outputs the control signal for the selection of the optical gate to the optical gates 6 according to the result of the analysis. The optical gate 6 is selected according to the control signal (i.e., control component for the selection of the optical gate), and the principal optical signal is outputted from the output port of the selected optical gate 6.

The optical signal outputted from the output port of the selected optical gate 6 is inputted to the wavelength converter 10$i$ ($i$ is a, b, c or d) connected to the selected output port. The light having one of wavelengths ($\lambda 1$–$\lambda 4$) are supplied to the wavelength converter 10$i$ from the multi-wavelength optical source 8$j$ ($j$ is a, b, c or d, and i=j) through the optical fiber and the optical multiplexer 11. The wavelength converter 10$i$ converts the wavelength of the optical signal into the wavelength (wavelength $\lambda 13$; however, $\lambda 13$ is one of $\lambda 1$–$\lambda 4$) adapted for the routing to the destination communication node #3 by means of the cyclic-wavelength arrayed-waveguide grating 60 having the wavelength routing function.

The optical signal whose wavelength has been converted into the wavelength $\lambda 13$ by way of the wavelength converter 10$i$ is guided to the input port 61$i$ ($i$ is one of a, b, c or d) of the cyclic-wavelength arrayed-waveguide grating 60 connected to the corresponding output port 2$i$ ($i$ is one of a, b, c or d) of the multi-wavelength optical source equipment 70 (Refer to FIG. 7).

With the cyclic-wavelength arrayed-waveguide grating 60, the output port leading to the desired communication node 30 is selected by the wavelength routing. In the case of this example, the output port connected to the communication node #3 is selected. In this way, the optical signal is routed to be received by the destination communication node #3 by the cyclic-wavelength arrayed-waveguide grating 60.

Similarly, the principal optical signal transmitted to the communication node #j from the communication node #i is converted into the desired wavelength $\lambda ij$ by the multi-wavelength optical source equipment 70 and routed on the basis of the converted wavelength $\lambda ij$ to the communication node #j by the cyclic-wavelength arrayed-waveguide grating 60.

As described below, the same effect as that in the above case can be. obtained where the cyclic-wavelength arrayed-waveguide grating 60 is incorporated into the multi-wavelength optical source equipment 70 shown in FIG. 13.

Composition Example 6 of the First Embodiment

Figure 14:
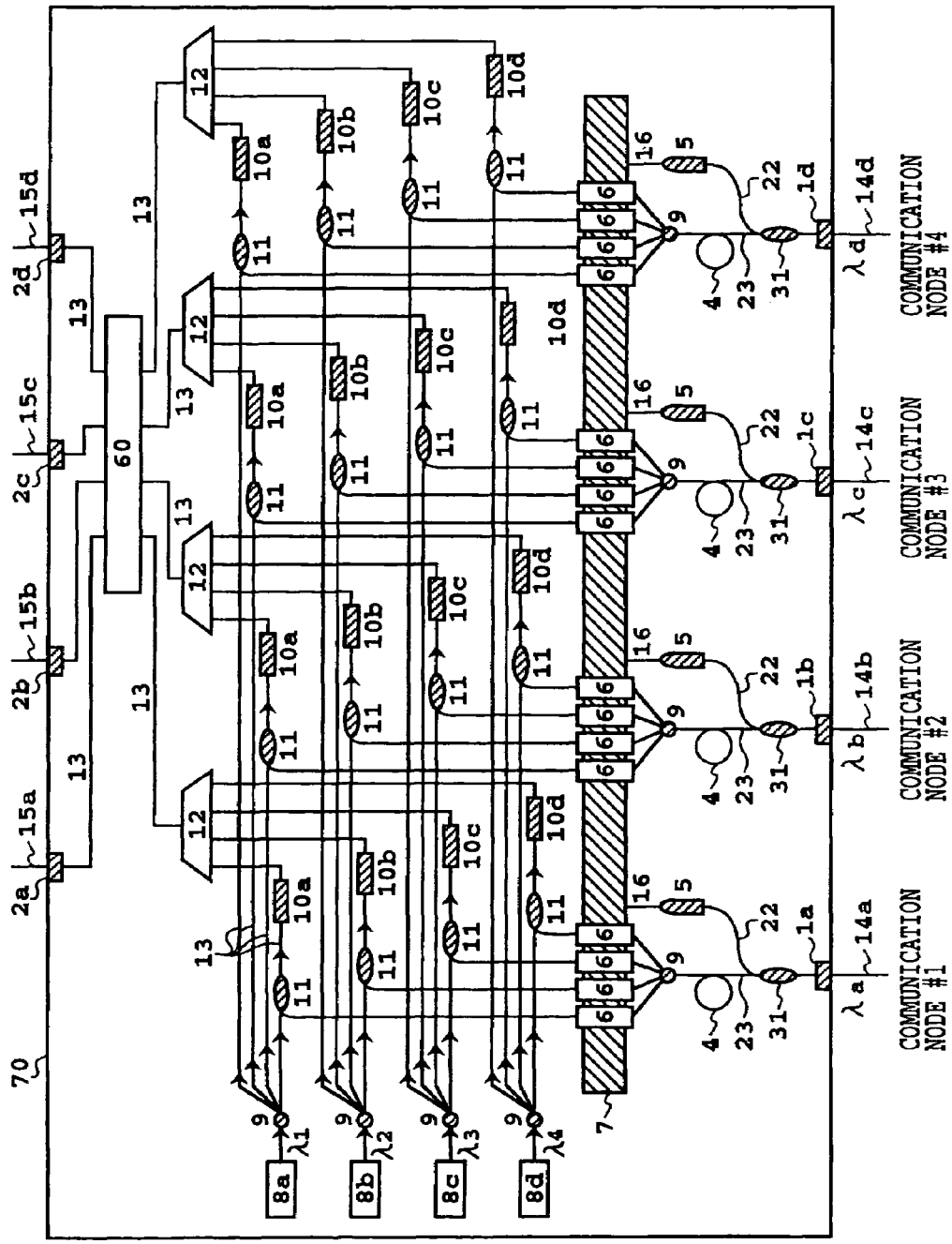
FIG. 14 is a block diagram showing the sixth example of the composition of the multi-wavelength optical source equipment according to the first embodiment of the present invention.

Next, the composition example 6 of the first embodiment of the present invention will be explained referring to FIG. 14. The parts shared to those of the preceding example are given shared numerals and the symbols and the explanation thereof are omitted.

This example is a variation of the composition example 5. To be specific, the multi-wavelength optical source equipment 70 incorporates the wavelength demultiplexer 31 for separating the principal optical signal and the optical signal for control differing in wavelength from the principal optical signal and the cyclic-wavelength arrayed-waveguide grating 60 as an optical component having the wavelength routing function.

The cyclic-wavelength arrayed-waveguide grating 60 is employed as an optical component having the wavelength routing function, but any other component having the equivalent function may also be employed as a substitute.

Composition Example 7 of the First Embodiment

Figure 15:
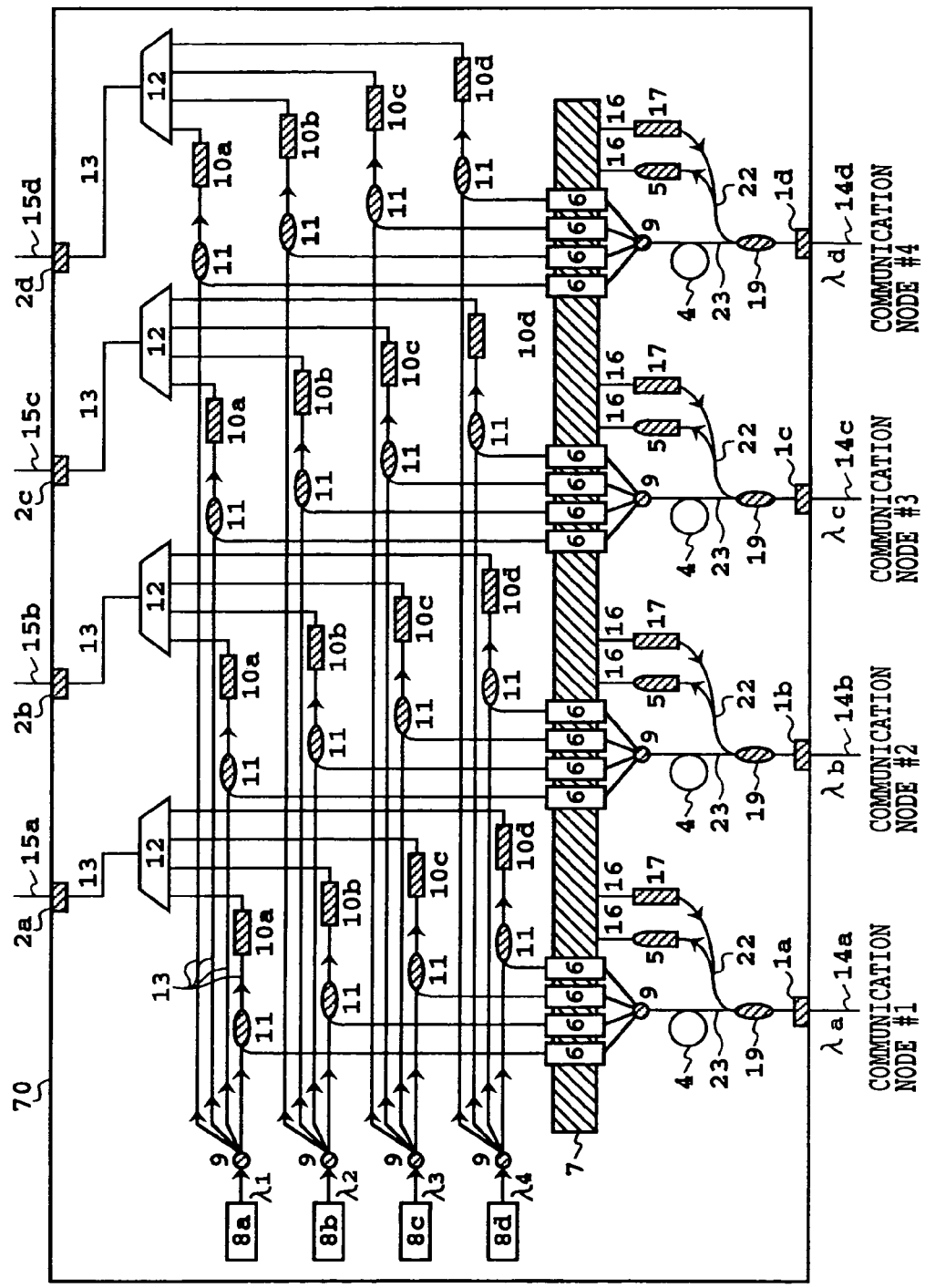
FIG. 15 is a block diagram showing the seventh example of the composition of the multi-wavelength optical source equipment according to the first embodiment of the present invention.

Next, the composition example 7 of the first embodiment of the present invention will be explained referring to FIG. 15. The parts shared to those of the previous examples are given shared numerals and symbols and the explanations thereof are omitted.

In the case of this example with the multi-wavelength optical source equipment 70, optical transmitters 17 for transmitting the information coming from the control system 7 to each of the communication nodes 30 are provided on the side of the first optical path 22. The rest of the composition is similar to the aforementioned composition example 5.

Each information of the control system 7 is transmitted, either selectively or by broadcasting, through the optical transmitter 17, to the corresponding communication nodes 30 connected to the multi-wavelength optical source equipment 70. In this way, the smooth communication among a plurality of communication nodes 30 constituting this optical network can be facilitated.

Composition Example 8 of the First Embodiment

Figure 16:
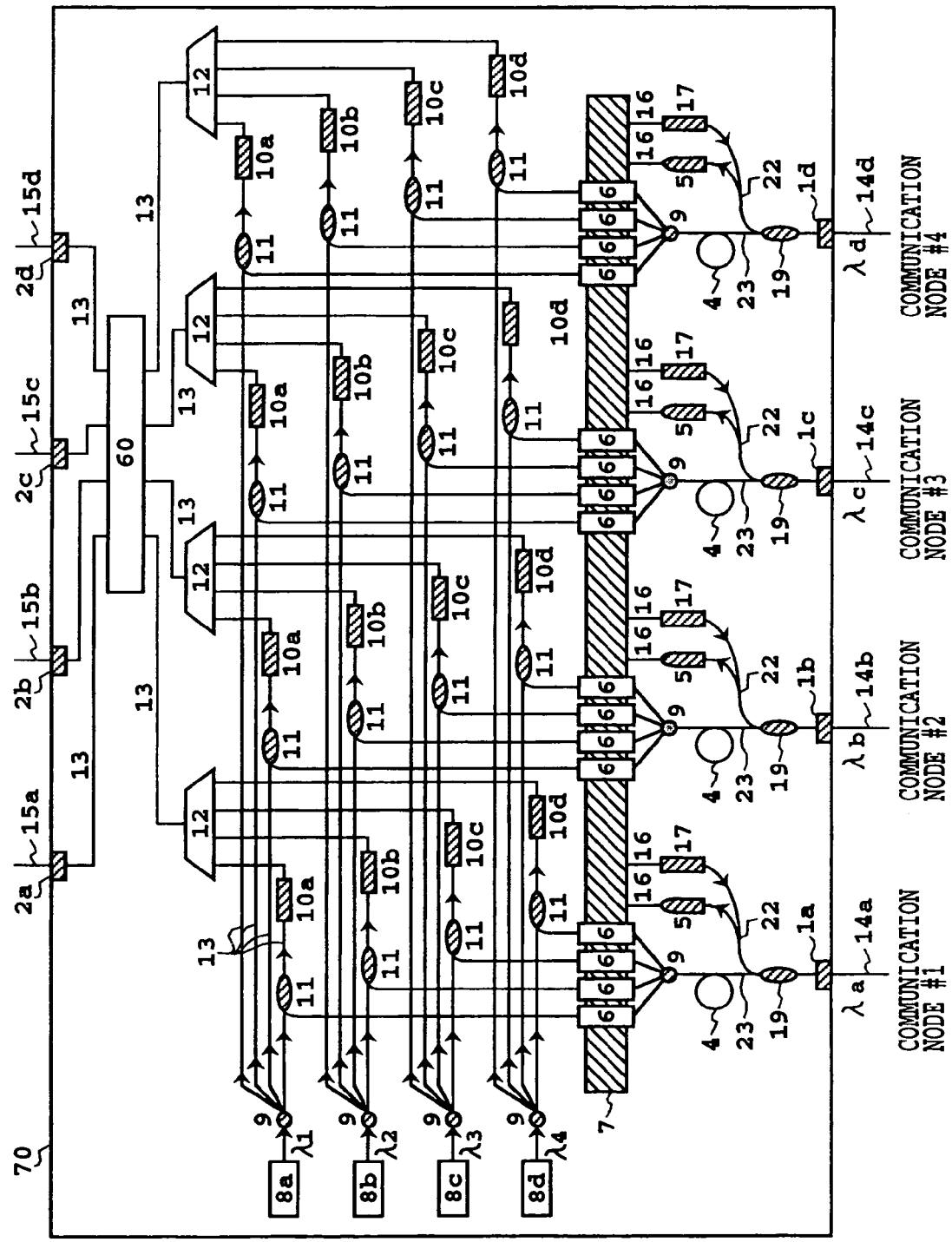
FIG. 16 is a block diagram showing the eighth example of the multi-wavelength optical source equipment according to the first embodiment of the present invention.

Next, the composition example 8 of the first embodiment of the present invention will be explained referring to FIG. 16. The parts shared to those of the previous examples are given shared numerals and symbols and the explanations thereof are omitted.

This example is a variation of the preceding composition example 7. More particularly, the multi-wavelength optical source equipment 70 incorporates above-mentioned optical transmitters 17 and the cyclic-wavelength arrayed-waveguide grating 60 as an optical unit having wavelength routing function.

In this example, the cyclic-wavelength arrayed-waveguide grating 60 is employed as an optical unit having the wavelength routing function, but any other optical unit having equivalent function may be employed as a substitute.

Composition Example 9 of the First Embodiment

Figure 17:
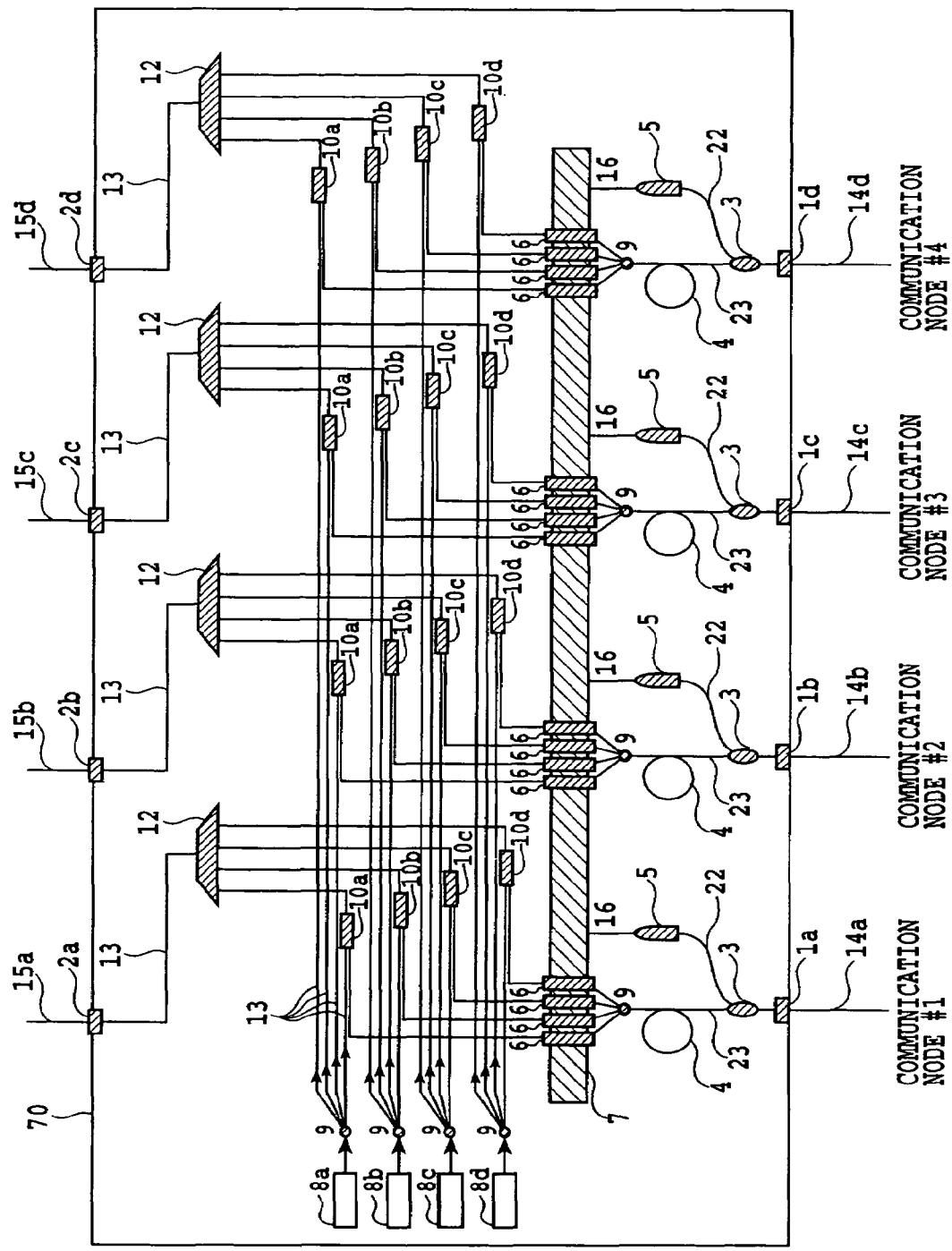
FIG. 17 is a block diagram showing the ninth example of the composition of the multi-wavelength optical source equipment according to the first embodiment of the present invention.

The composition example 9 of the first embodiment of the present invention will be explained referring to FIG. 17. The parts shared to those of previous examples are given shared numerals and symbols and the explanations thereof are omitted.

This example is a variation of the previous examples 1–8. More specifically, each of the wavelength converters 10$a$–10$d$ is provided with two input ports. One of the two input ports of each of the wavelength converters 10$a$–10$d$ receives the light from the shared optical sources 8$a$–8$d$, while the other receives the optical signal passing the optical gate 6.

Each of the output ports of the wavelength converters 10$a$–10$d$ outputs the optical signal whose wavelength is converted into the wavelength of the shared optical source. More particularly, where the wavelengths of the shared optical sources 8$a$–8$d$ are given as $\lambda a$, $\lambda b$, $\lambda c$ and $\lambda d$, the optical signal whose wavelength is converted into $\lambda a$ is outputted from the wavelength converter 10$a$ connected to the shared optical source 8$a$; the optical signal whose wavelength is converted into $\lambda b$ is outputted from the wavelength converter 10$b$ connected to the shared optical source 8$b$; the optical signal whose wavelength is converted into $\lambda c$ is outputted from the wavelength converter 10$c$ connected to the shared optical source 8$c$; the optical signal whose wavelength is converted into $\lambda d$ is outputted from the shared optical source 8$d$.

The wavelength converters 10$a$–10$d$ may be replaced with the wavelength converters utilizing the cross-phase modulation of the semiconductor optical amplifier, though not limited to these substitutes as long as other substitutes have equivalent functions.

Composition Example 10 of the First Embodiment

Figure 18:
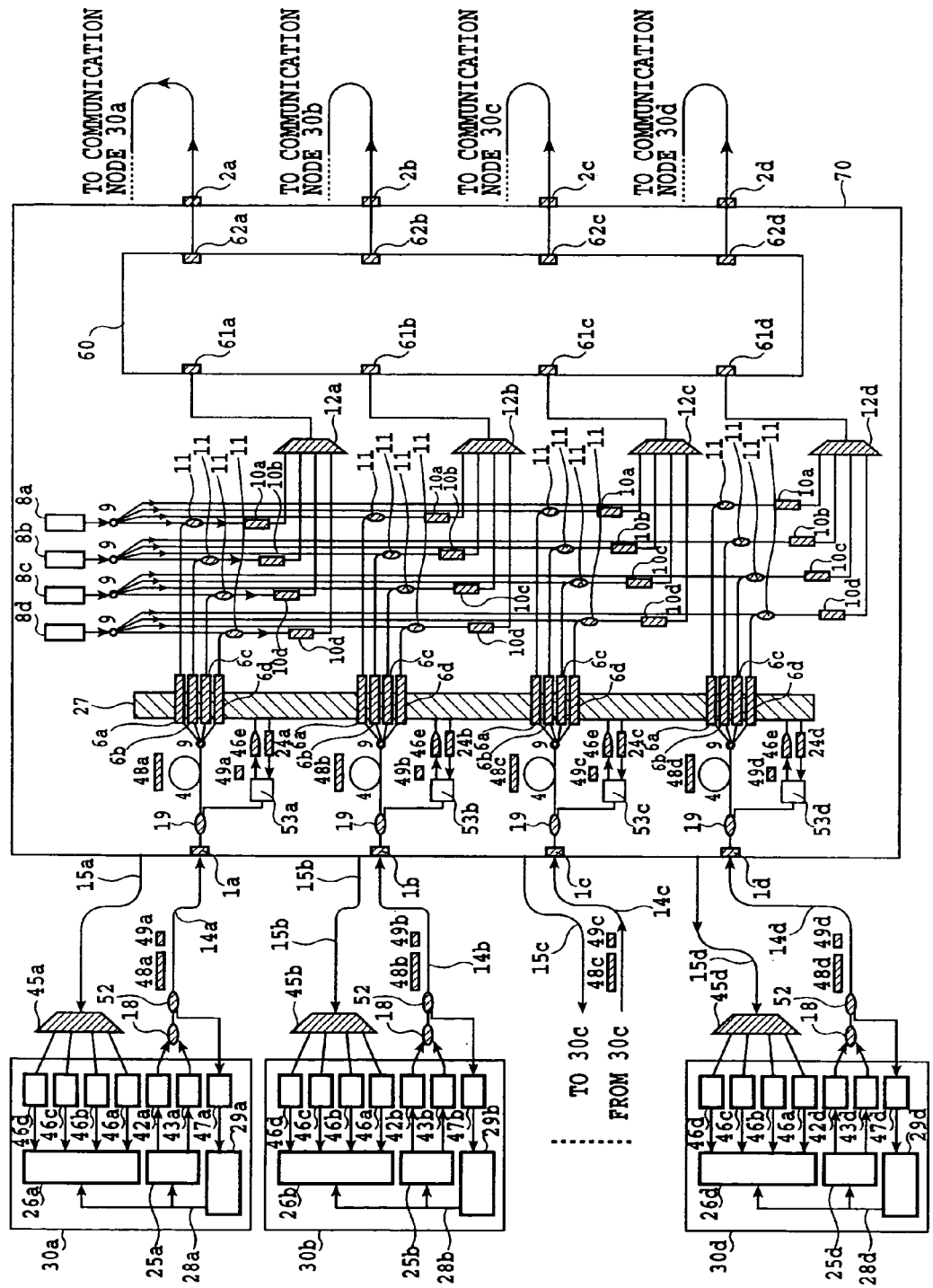
FIG. 18 is a block diagram showing the tenth example of the composition of the multi-wavelength optical source equipment as the first embodiment of the present invention.

FIG. 18 is a schematic diagram illustrating the composition of the multi-wavelength optical source equipment according to the composition example 10 of the first embodiment of the present invention.

In FIG. 18, Numerals 30a–30d denote communication nodes. (In FIG. 18, the communication node 30c is not shown, but the composition is similar to those of other communication nodes.) Numeral 70 denotes the multi-wavelength optical source equipment; Numerals 1a–1d, the input ports of the multi-wavelength optical source equipment 70; Numerals 2a–2d, the output ports of the multi-wavelength optical source equipment 70.

With respect to each of the communication nodes 30a–30d, Numerals 42a–42d denote the optical signal transmitters including the optical source and employed for transmitting the optical signal; Numerals 43a–43d, the optical label signal transmitters including the optical source and employed for transmitting the optical label signal; Numerals 46a–46e, optical receivers; Numerals 47a–47d, the optical receivers employed for receiving the optical clock signal. Numerals 25a–25d are the clock generator for the optical signal transmitter, which supplies the clock frequency to be used for the generation of the optical signal to the optical signal transmitter including the optical source for transmitting the optical signal; Numerals 26a–26d are the optical signal regenerators for regenerating the. optical signals received by the optical receivers 46a–46d; Numerals 29a–29d are clock frequency regenerators for regenerating the clock frequency from the electric signal converted from the optical clock signal by means of the optical clock signal receivers 47a–47d. Numerals 28a–28d are the electric lines for supplying the clock frequency regenerated by the clock frequency regenerators 29a–29d to the clock generators 25a–25d for the optical signal transmitter and the optical signal regenerators 26a–26d.

Numerals 45a–45d are the wavelength demultiplexers; Numeral 18, an optical combiner; Numeral 52, an optical combiner & splitting device. Numerals 14a–14d are the optical lines for connecting the optical combiner & splitting devices 52 of each communication node and the input port of the multi-wavelength optical source equipment 70; Numerals 15a–15d, the optical lines for connecting the output port of the multi-wavelength optical source equipment 70 and the wavelength demultiplexers 45a–45d of the communication nodes 30a–30d; Numerals 48a–48d, optical signals; Numerals 49a–49d, optical label signals.

In the multi-wavelength optical source equipment 70, Numerals 24a–24d are the optical transmitters for distributing the reference clock frequency, which is used when each of the communication nodes 30a–30d receives and transmits the optical signal; Numeral 4, the optical delay device; Numerals 6a–6d, the optical gates; Numeral 9, the optical splitter; Numerals 8–8d, the shared optical sources; numerals 10a–10d, the wavelength converters; Numeral 11, the wavelength multiplexer; Numerals 12a–12d, the wavelength multiplexers; Numeral 27, an optical gate controller & reference clock generating system; Numerals 53a–53d, the optical combiner & splitting devices; Numeral 19, the wavelength demultiplexer and multiplexer.

Numeral 60 denotes the cyclic-wavelength arrayed-waveguide grating; Numerals 61a–61d, the input ports of the cyclic-wavelength arrayed-waveguide grating 60; Numerals 62a–62d, the output ports of the cyclic-wavelength arrayed-waveguide grating 60.

In the case of the composition shown in FIG. 18, four communication nodes are provided, but the present invention is not limited to the number of communication nodes according to the present example.

In this composition, an optical fiber type optical combiner, for example, may be employed as the optical combiner 18; an optical fiber type demultiplexer & multiplexer, for example, as the wavelength demultiplexer & multiplexer 19; optical parts including the semiconductor optical amplifiers, for example, as the optical gates 6a–6d; a silica glass waveguide type optical splitter, for example, as the optical splitter 9; optical fibers, for example, as the optical lines 14a–14d and optical lines 15a–15d; silica glass optical waveguide type wavelength demultiplexers, for example, as the wavelength demultiplexers 45a–45d; optical fiber type optical combiner & splitting devices, for example, as the optical combiner & splitting devices 52 and 53a–53d; distributed feedback type semiconductor lasers, for example, as the shared optical sources 8a–8d; semiconductor optical amplifier type optical wavelength converters utilizing cross gain modulation, for example, as the wavelength converters 10a–10d; silica glass optical waveguide type wavelength multiplexers, for example, as the wavelength multiplexers 12a–12d; optical fiber type optical delay devices, for example, as the optical delay devices 4, but not limited thereto.

The wavelengths of the shared optical sources 8a, 8b, 8c and 8d are λa, λb, λc and λd respectively. The wavelength converters 10a, 10b, 10c and 10d respectively receive the lights having wavelengths λa, λb, λc and λd respectively, and respectively convert the wavelengths of the optical signals transmitted passing the optical gates 6a–6d respectively connected to the input ports of the optical wavelength converters 10a–10d to the wavelengths of the shared optical sources. More particularly, the wavelength of the optical signal that has passed the optical gate 6a is converted into the wavelength λa by the wavelength converter 10a and outputted from the output port of the wavelength converter 10a. The wavelength of the optical signal that has passed the optical gate 6b is converted into the wavelength λb by the wavelength converter 10b and outputted from the output port of the wavelength converter 10b. The wavelength of the optical signal that has passed the optical gate 6c is converted into the wavelength λc by the wavelength converter 10c and outputted from the output port of the wavelength converter 10c. The wavelength of the optical signal that has passed the optical gate 6d is converted into wavelength λd by the wavelength converter 10d and outputted form the output port of the wavelength converter 10d.

FIG. 21 shows the relationship of the input and output wavelengths by each port of the cyclic-wavelength arrayed-waveguide grating 60. The wavelength routing characteristic of the cyclic-wavelength arrayed-waveguide grating 60 will be explained referring to FIG. 21. When the lights respectively having wavelengths λa, λb, λc and λd are fed to the input port 61a, among the wavelengths λa–λd, λa is outputted from the output port 62a, λb from the output port 62b, λc from the output port 62c and λd from the output port 62d as shown in FIG. 21. Similarly, when the lights respectively having the wavelengths λa, λb, λc and λd are fed to each of the input ports 61b–61d, according to the rule shown in FIG. 21, the lights respectively having the wavelengths λa, λb, λc and λd are outputted respectively from the output ports 62a–62d.

Figure 22:
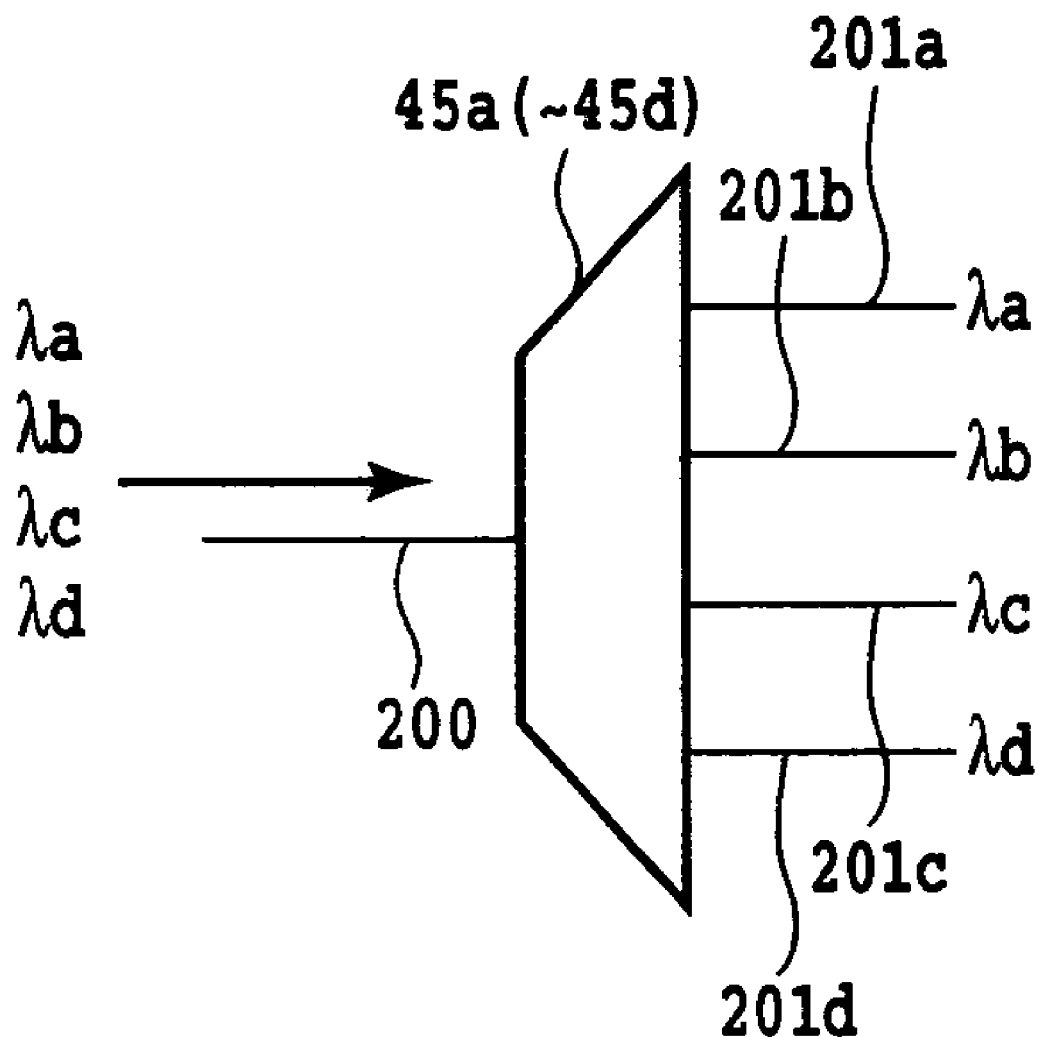
FIG. 22 is a schematic diagram illustrating the input-output relation of the wavelength demultiplexers 45a–45d.

The wavelength demultiplexers 45a–45d of the communication nodes 30a–30d respectively have a function of demultiplexing the lights having the wavelengths λa, λb, λc and λd incoming to input port 200 to different output ports 201a–201d respectively as shown in FIG. 22.

First, the process through which the communication is carried out among individual communication nodes in the case of the network composition shown in FIG. 18 will be explained. In the following, the process through which the optical signal 48a transmitted from the communication node 30a connected to the input port 1a is transmitted to the destination communication node 30d by means of the multi-wavelength optical source equipment 70 shown in FIG. 18 by giving an example.

The optical signal 48a and the optical label signal 49a sent out from the communication node 30a to the communication node 30d passes the optical combiner 18 and optical combiner & splitting device 52 to be fed to the input port 1a of the multi-wavelength optical source equipment 70.

The optical signal 48a and the optical label signal 49a respectively fed to the input port 1a of the multi-wavelength optical source equipment 70 is separated for the first optical path connected to the optical combiner & splitting device 53 and the second optical path connected to the optical delay device 4.

The optical label signal 49a branched to the first optical path is guided to the optical receiver 46e through the optical combiner & splitting device 53a. The optical receiver 46e is connected to the optical gate controller & reference clock frequency supply system 27. On the other hand, the optical signal 48a branched to the second optical path is guided to a plurality of optical gates 6a–6d respectively through the optical delay device 4 and the optical splitter 9.

The optical signal 48a fed to the optical gates 6a–6d is outputted from the optical gate 6i (i denotes any of a, b, c and d) selected according to the information of the optical label signal 49a previously received by the optical receiver 46e by the optical gate controller & reference clock frequency supply system 27. In this case, the optical gates 6a–6d are controlled by the optical gate controller & reference clock frequency supply system 27. The optical gate 6i is connected to the wavelength converter 10j (j denotes any of a, b, c and d) which converts the wavelength of the optical signal 48a into the wavelength adapted for routing to the communication node 30d by using the cyclic-wavelength arrayed-waveguide grating 60 having the wavelength routing function.

In the case of the communication from the communication node 30a to the communication node 30d, the output ports of the optical gates 6a–6d are respectively connected to the input port 61a of the cyclic-wavelength arrayed-waveguide grating 60 through the wavelength multiplexer 11, wavelength converters 10a–10d and wavelength multiplexer 12, so that the optical signal having wavelength λd is routed to the communication node 30d by the cyclic-wavelength arrayed-waveguide grating 60 as shown in FIG. 21. Therefore, the optical gate 6d, connected to the wavelength converter 10d for converting the wavelength of the optical signal 48a into the wavelength λd, is activated for passing the optical signal 48a according to the control signal from the optical gate controller and reference clock frequency supply system 27.

The optical signal 48a outputted from the optical gate 6d is fed to the wavelength converter 10d connected with the output port of the optical gate to have its wavelength converted into λd and introduced to the input port 61a of the cyclic-wavelength arrayed-waveguide grating 60 through the wavelength multiplexer 12a. The optical signal 48a introduced to the input port 61a, having wavelength λd, is outputted from the output port 62d of the cyclic-wavelength arrayed-waveguide grating 60 connected to the communication node 30d by the wavelength routing function of the cyclic-wavelength arrayed-waveguide grating 60 shown in FIG. 21.

The optical signal 48a outputted from the output port 62d of the cyclic-wavelength arrayed-waveguide grating 60 passes the output port 2d of the multi-wavelength optical source equipment 70 and the optical line 15d to arrive at the input port of the wavelength demultiplexer 45d on the side of the communication node 30d. Since the wavelength demultiplexers 45a–45d employed in this example have the output characteristic shown in FIG. 22, the optical signal 48a is outputted from the output port 201d of the wavelength demultiplexer 45d to be received by the optical receiver 46d.

Similarly, the optical signal 48i (i denotes any of a, b, c and d) transmitted from any given communication node 30i (i denotes any of a, b, c and d) to any given communication node 30j (j denotes any of a, b, c and d) is routed by the multi-wavelength optical source equipment 70 to the communication node 30j (j denotes any of a, b, c and d).

Especially, the multi-wavelength optical source equipment 70 in the case of this example is provided with the optical transmitters 24a–24d for employed distributing the reference clock frequency, and these optical transmitters transmit the optical signal containing the reference frequency for the clock frequency to be used by each of the communication nodes 30a–30d in transmitting the optical signals 48a–48d and receiving the optical signal.

The frequency fcn that is 1/N (N=positive integer) of the frequency fc from the optical gate controller & reference clock frequency supply system 27 is sent, as an electric signal, to the optical transmitters 24a–24d for the distribution of the reference clock frequency, and the transmitters 24a–24d for the distribution of the reference clock frequency transmit the optical clock signal having frequency component fcn. The optical clock signal having the frequency component fcn is that when the optical clock signal is converted to an electrical signal by the optical receiver, the electrical signal includes the fcn frequency component. All the optical transmitters 24a–24d, for the distribution of the reference clock frequency, transmit identical optical clock signals.

The optical clock signals, transmitted from the optical transmitters 24a–24d for the distribution of the reference clock frequency, pass the optical combiner & splitting devices 53a–53d, the wavelength demultiplexer & multiplexer 19 and the optical line 14 and branched by the optical combiner & splitting device 52 to be received by the optical receivers 47a–47d for receiving the optical clock signal of each of the communication nodes 30a–30d.

In each of the communication nodes 30a–30d, the optical clock signal received by the optical receivers 47a–47d for receiving the optical clock signal is converted into an electric signal, and the electric signal is used to regenerate the clock frequency fcn from the electric signal by means of the clock frequency regenerators 29a–29d; the clock frequency fcn is supplied to each of the clock suppliers for employed transmitting the optical signal 25a–25d and each of the optical signal regenerators 26a–26d through the electric line 28.

Each of the clock suppliers 25a–25d supplies the clock frequency fcn, which is used when each of the optical signal transmitters 42a–42d, respectively including the optical source for the transmission of the optical signal, transmits each of the optical signals 48a–48d, while each of the optical signal regenerators 26a–26d regenerates the optical signal received by each of the optical receivers 46a–46d by using the clock frequency fcn. In other words, in each of the communication nodes 30a–30d, each of the optical signal transmitters 42a–42d, each including an optical source for transmitting the optical signal, transmits optical signals 48a–48d by using the clock frequency fcn, serving as the reference clock supplied from the multi-wavelength optical source equipment 70, while, in each of the optical signal regenerators 26*a*–26*d* for regenerating the optical signal received by each of the optical receivers 46*a*–46*d*, the clock frequency fcn is used as the clock frequency when regenerating the optical signal.

As described above, where the environment is provided so that all the optical transmitters of each communication node transmit the optical signals 48*a*–48*d* on the basis of a shared clock frequency. The regeneration of the optical signals 48*a*–48*d* to be transmitted and received among individual communication nodes can be made easier.

Composition Example 11 of the First Embodiment

Figure 19:
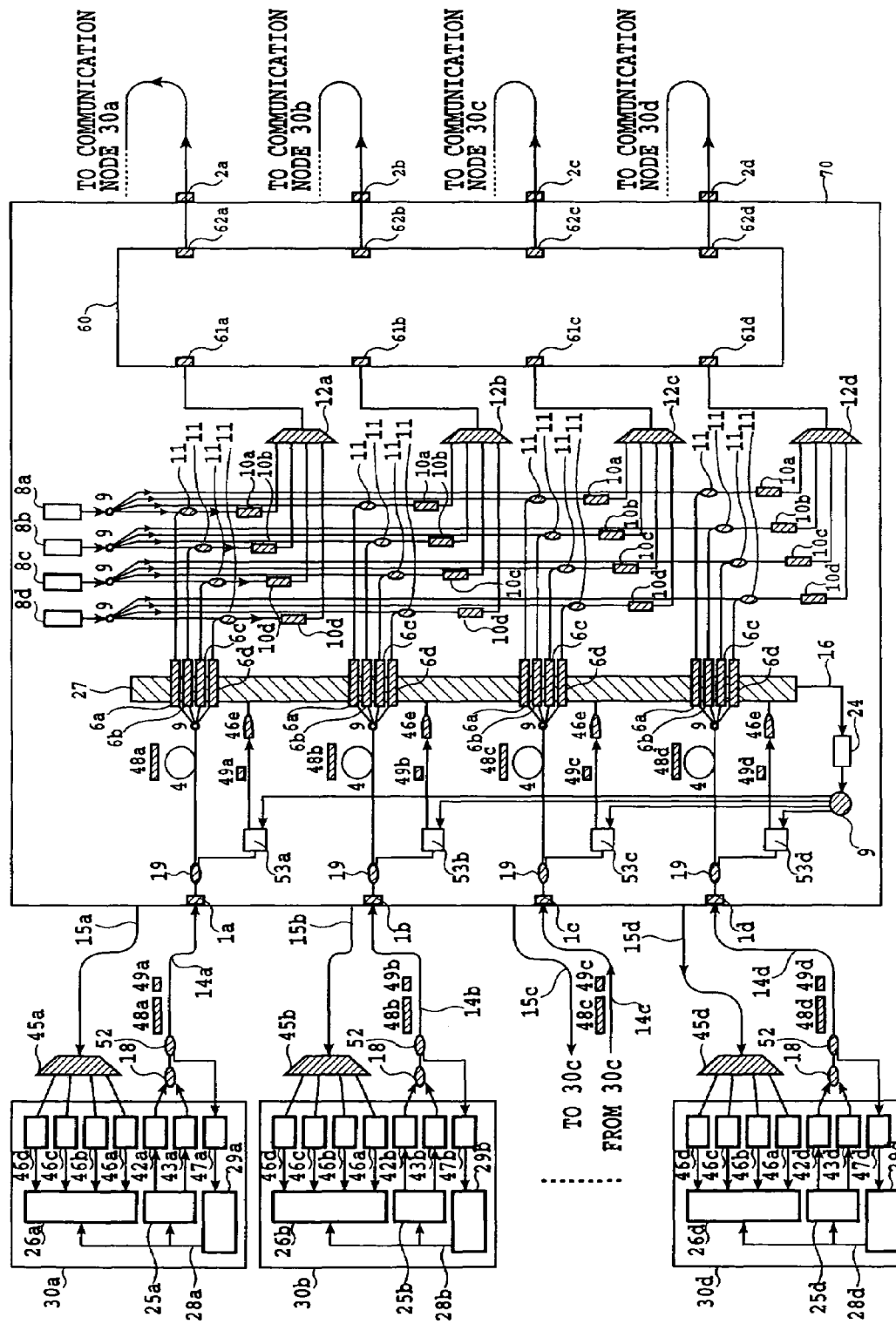
FIG. 19 is a block diagram showing the eleventh example of the composition of the multi-wavelength optical source equipment according to the first embodiment of the present invention.

Next, the composition example 11 of the first embodiment of the present invention will be explained referring to FIG. 19. The parts shared to those in the cases of the previous composition examples are given shared numerals and symbols and the explanations thereof are omitted.

This composition example is a variation of previously described composition example 10. More particularly, in the case of the composition example 10 shown in FIG. 18, each of the communication nodes 30*a*–30*d* is provided with a plurality of optical transmitters 24*a*–24*d* for the distribution of the reference clock frequency. In contrast, in the case of the present example, the a plurality of the optical transmitters above-mentioned for the distribution of the reference clock frequency are replaced with a single optical transmitter 24 for the distribution of the reference clock frequency as shown in FIG. 19.

The optical clock signal having the frequency serving as the reference clock frequency for the clock frequency which is used by each of the communication nodes 30*a*–30*d* when transmitting the optical signals 48*a*–48*d* and receiving the optical signals, can be provided by a single optical transmitter 24 for the distribution of the reference clock frequency and distributed by the optical splitter 9 to be transmitted to each of the communication nodes 30*a*–30*d* through the optical combiner & splitting devices 53*a*–53*d*.

Composition Example 12 of the First Embodiment

Figure 20:
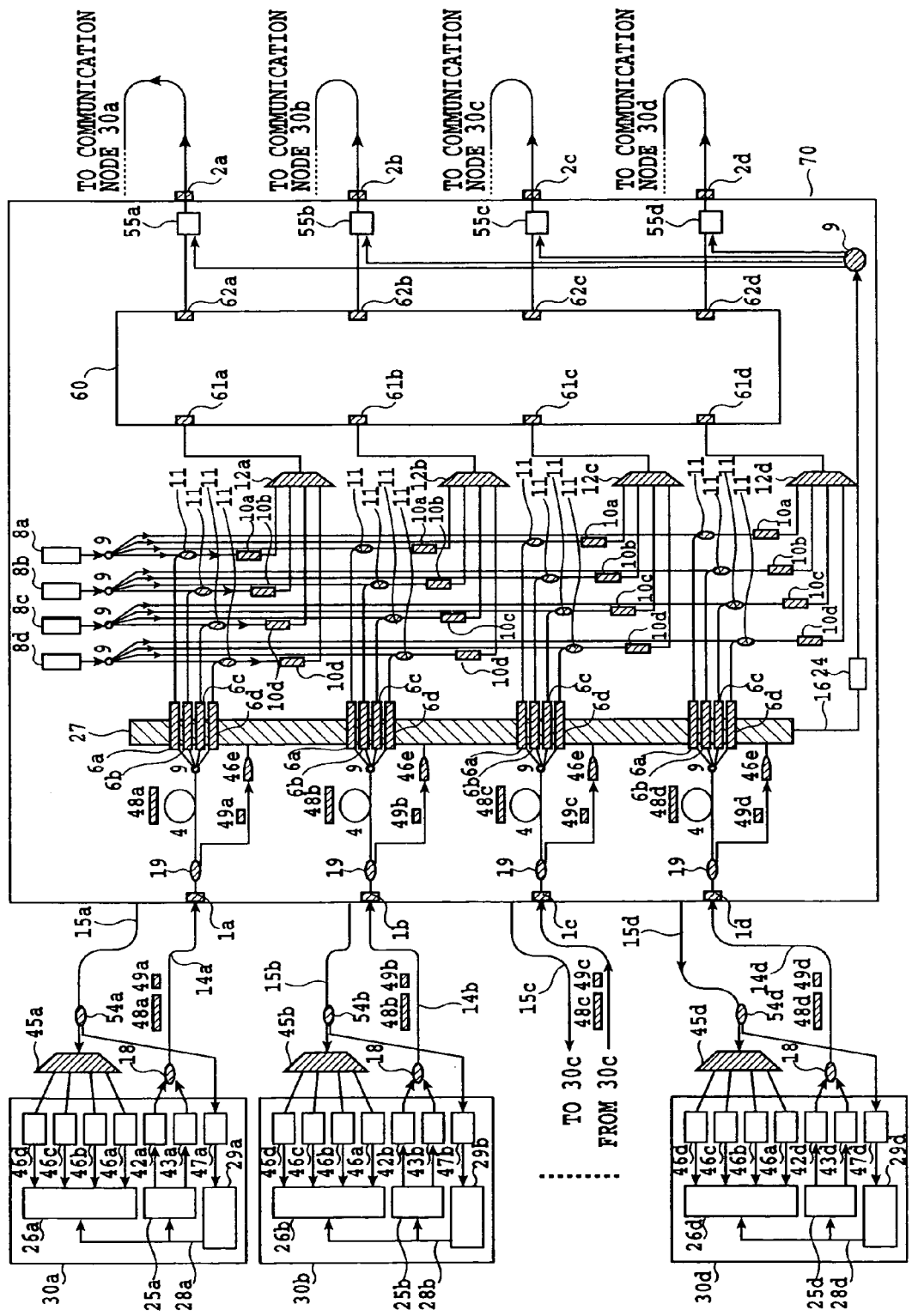
FIG. 20 is a block diagram showing the twelfth example of the composition of the multi-wavelength optical source equipment according to the first embodiment of the present invention.

Next, the composition example 12 of the first embodiment of the present invention will be explained referring to FIG. 20. The parts shared to those of the composition example 11 are given shared numerals and symbols and the explanations thereof are omitted.

This example is a variation of previous composition example 11. That is, in the case of this example, the optical clock signal having a frequency serving as reference clock frequency for the clock frequency, which is used when each of the communication nodes 30*a*–30*d* transmits the optical signals 48*a*–48*d* and receiving the optical signals, can be transmitted from a single optical transmitter 24 for the distribution of the reference clock frequency, of the multi-wavelength optical source equipment 70. The optical clock signal transmitted from the optical transmitter 24 for the distribution of the reference clock frequency is distributed by the optical splitter 9 and passes the optical combiners 55*a*–55*d* for combining the optical signal and the optical clock signal, the output ports 2*a*–2*d*, the optical lines 15*a*–15*d* and the wavelength demultiplexers 54*a*–54*d* to be received by the optical receivers 47*a*–47*d* employed for receiving the optical clock signal in each of the communication nodes 30*a*–30*d*.

Composition Example 1 of the Second Embodiment

Figure 23:
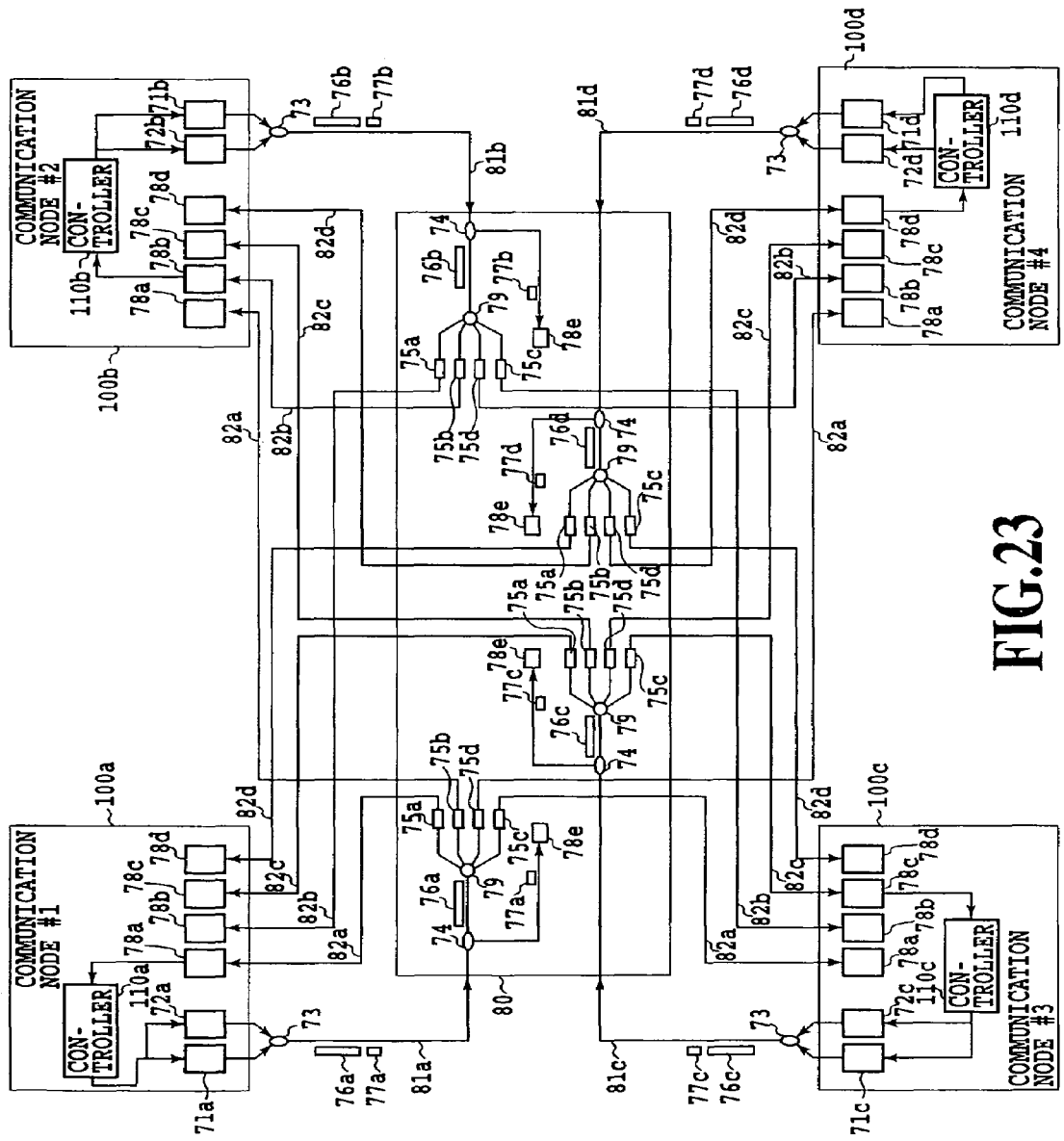
FIG. 23 is a block diagram showing the first example of the general composition of the optical communication system according to the second embodiment of the present invention.

FIG. 23 is a schematic diagram showing the basic composition of the second embodiment of the present invention.

In each of the communication nodes 100*a*–100*d*, Numerals 71*a*–71*d* denote the optical signal transmitters including the optical sources for the transmission of the optical signals; Numerals 72*a*–72*d*, the optical label signal transmitters including the optical sources for the transmission of the optical label signals; 78*a*–78*d*, the optical receivers; Numerals 110*a*–110*d*, the controllers (transmission time lag adjusters) relating to the present invention.

In the router 80, Numeral 74 denote a wavelength demultiplexer; Numerals 75*a*–75*d*, optical gates; Numeral 79, an optical splitter. The optical path lengths between respective output ports of the optical splitter 79 and respective optical gates 75*a*–75*d* are designed to be equal to one another.

Further, Numeral 73 denotes an optical combiner; Numerals 76*a*–76*d*, optical signals; Numerals 77*a*–77*d*, optical label signals. Numerals 81*a*–81*d* are the optical transmission lines connecting the optical combiner of each communication node and the router 80; Numerals 82*a*–82*d*, the optical transmission lines connecting the router 80 and the optical receivers 78*a*–78*d* of the communication nodes 100*a*–100*d*.

Figure 4:
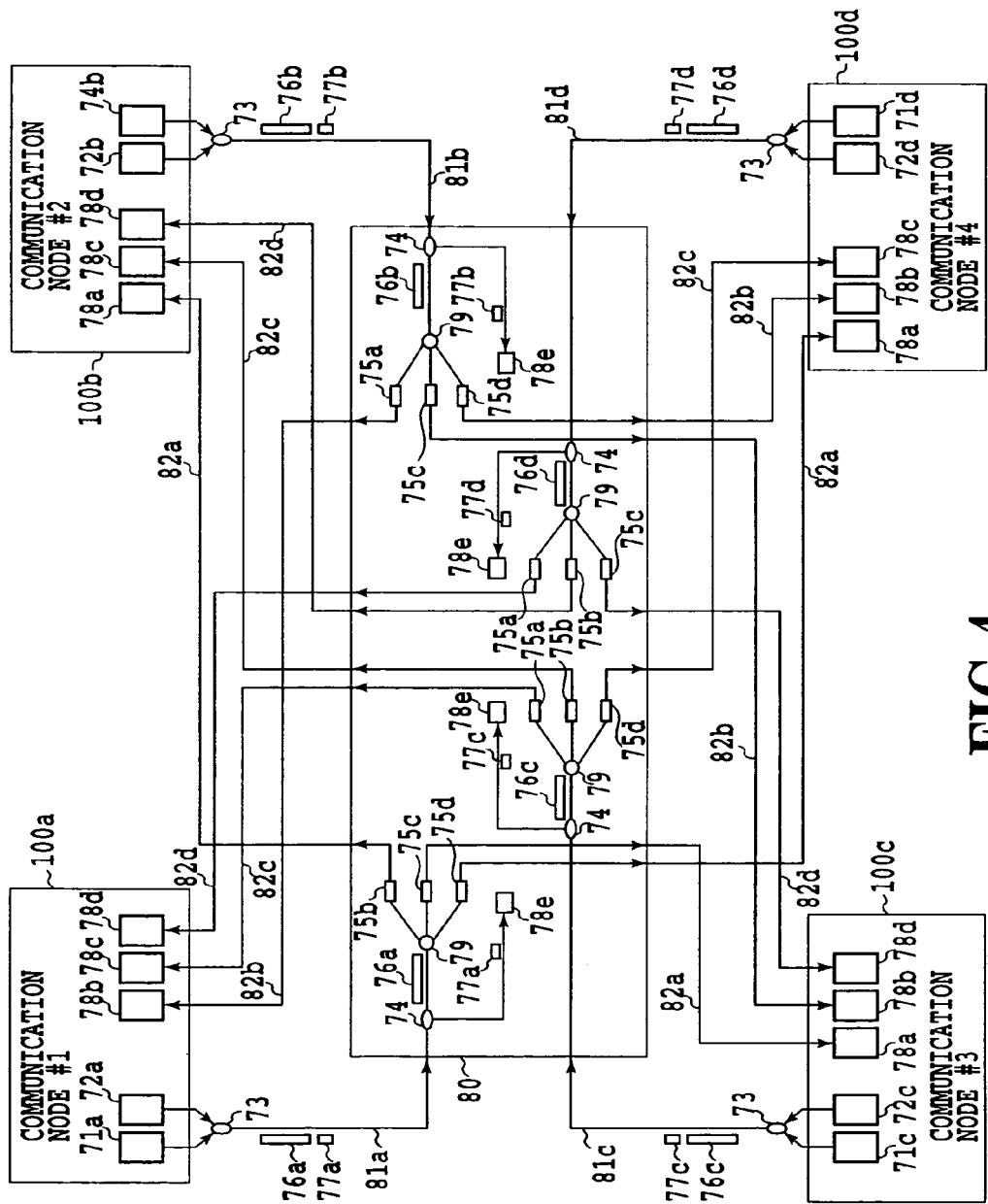
FIG. 4 is a block diagram schematically showing the composition of a conventional optical communication system.

The second embodiment of the present invention has, as shown in FIG. 23, a basic composition and function similar to those of the conventional composition described in FIG. 4, except that a new configuration for self-supportingly and independently adjusting the transmission time lag T between the optical signal and the optical label signal carrying the address information of the optical signal by each of the communication nodes added to the basic composition.

In the following, the term "loop-back optical signal" is used, which is defined as an optical signal whose destination address is the communication node that transmitted the optical signal.

According to the new configuration, each of the communication nodes 100*a*–100*d* is provided with one of the controllers 110*a*–110*d* for executing the computing control, which will be described later, by controlling for transmitting a loop-back optical signal and one of the optical receivers 78*a*–78*d* for receiving the loop-back optical signal returned through the router 80 are added respectively to the basic composition. In other words, a is obvious from the comparison of FIG. 23 and FIG. 4, in the case of the present example, as an optical receiver for receiving the loop-back optical signal, the optical receiver 78*a* is added for the communication node #1 as the optical receiver for receiving the loop-back optical signal; the optical receiver 78*b* is added for the communication node #2; the optical receiver 78*c* is added for the communication node #3; the optical receiver 78*d* is added for the communication node #4. Further, as described later, each of the controllers 110*a*–110*d* has a function to transmit a loop-back optical signal through one of the optical signal transmitters 71*a*–71*d* and an optical label signal carrying the address information of the loop-back optical signal through one of the optical signal transmitters 72*a*–72*d* and receives the loop-back optical signal through the router 80, for analysis and adjust the transmission time lag between the optical signal and the optical label signal according to the result of the analysis.

Further, the router 80 comprises additional optical gates 75*a*–75*d*, which respectively become open state when the optical label signals 77*a*–77*d* for the loop-back optical signals from the communication nodes 100*a*–100*d* are received. That is, the optical gate 75*a* is added for the communication node #1; optical gate 75*b*, for the communication node #2; optical gate 75*c*, for the communication node #3; optical gate 75*d*, for the communication node #4. Further, the router 80 is connected with each of the optical transmission lines for returning the loop-back optical signal, which has passed each of the optical gates 75*a*–75*d*, to each of the communication nodes 100*a*–100*d* which has transmitted the loop-back optical signal addressed to itself. That is, the router 80 is connected to the optical transmission line 82a corresponding to the communication node #1, the optical transmission line 82b corresponding to the communication node #2, the optical transmission line 82c corresponding to the communication node #3 and the optical transmission line 82d corresponding to the communication node #4 respectively so that the loop-back optical signal transmitted from each of the communication nodes 100a–100d can be returned to where it has been transmitted.

In the composition example shown in FIG. 23, there are provided four communication nodes, but the present invention is not limited to this composition example. Further, in the case shown in FIG. 23, the output ports of the optical gates 75a–75d are directly connected to the optical receivers 78a–78d by the optical transmission lines 82a–82d, but other optical parts (not shown) may be connected to each of the optical transmission lines between the optical gates 75a–75d and the optical receivers 78a–78d. However, such optical parts are not supposed to have a switching function for passing/interception of the optical signal similar to the function of the optical gates 75a–75d.

A silica glass waveguide type optical combiner, for example, may be used as the optical combiner 73; a silica glass waveguide type optical demultiplexer, for example, as the wavelength demultiplexer 74; an optical part including semiconductor optical amplifier, for example, as the optical gates 75a–75d; a silica glass waveguide type optical splitter, for example, as the optical splitter 9; optical fibers, for example, as the optical transmission lines 81a–81d and 82a–82d. However, any other parts having equivalent functions may be used as substitutes in the case of the present invention.

Next, the operation of the optical communication system as the present embodiment of the invention will be explained.

In the case of the present optical communication system, the communication is made by using the optical signals 76a–76d and the optical label signals 77a–77d. In the following, an explanation will be made as to the process in which a communication is made by the optical signal 76a and accompanying optical label signal 77a transmitted from the communication node #1 of 100a to the addressed communication node #3 (100c).

Figure 5:
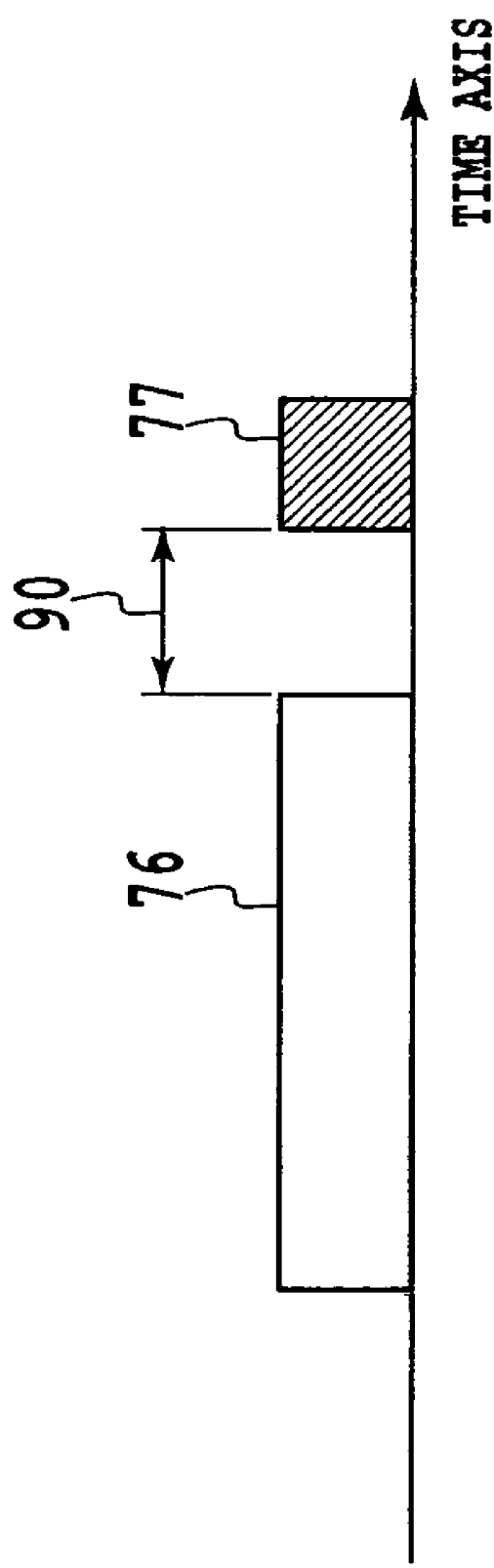
FIG. 5 is a schematic diagram illustrating the time lag between the front of the optical signal and the end of the optical label signal in a conventional optical communication system.
Figure 6:
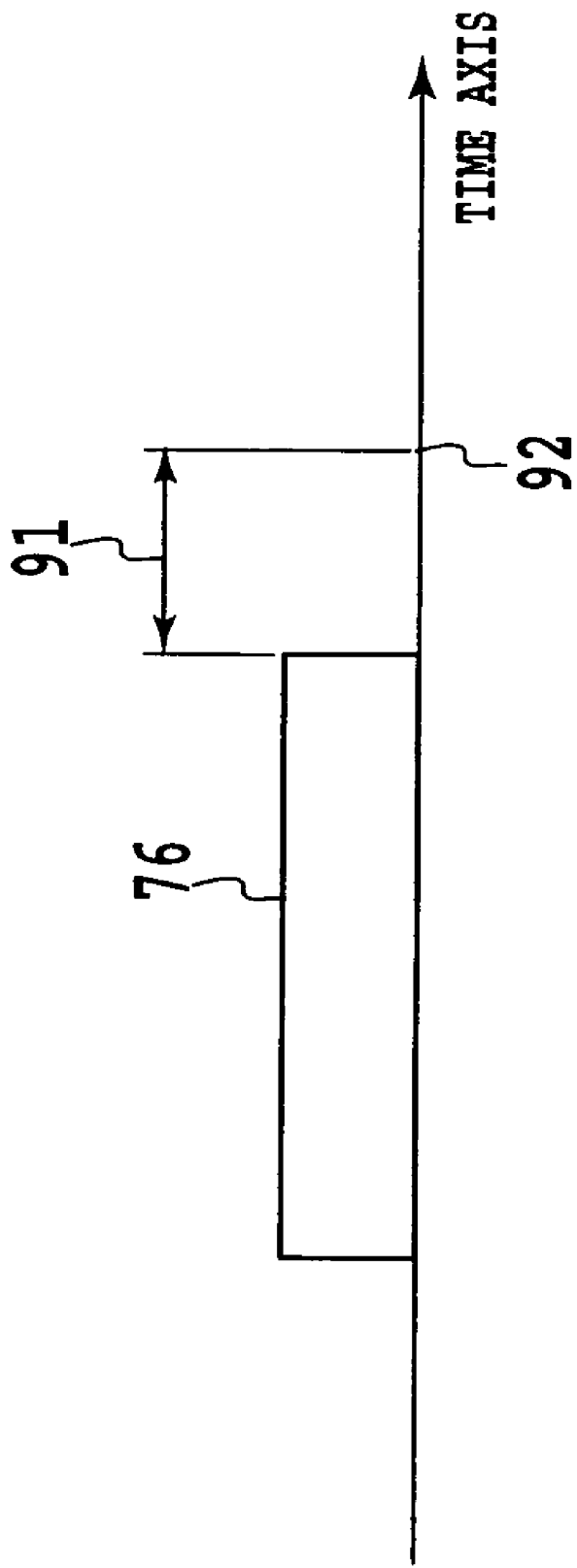
FIG. 6 is a schematic diagram illustrating the time lag between the time at which the optical gate started to drive and the time at which the optical signal arrives at the optical gate in a conventional optical communication system.

When transmitting the optical signal 76a addressed to the communication node #3 from the communication node #1, the optical signal label signal 77a carrying the address information of the optical signal 76a is transmitted from the optical label signal transmitter 72a so that the optical signal 76a and the optical label signal 77a, keeping a certain time lag 90 there-between, are transmitted by the optical transmission line 81 as the timing chart shown in FIG. 5.

The optical signal 76a and the optical label signal 77a arrived at the router 80 is separated by the wavelength demultiplexer 74, and the optical signal 76a is guided to the first optical path, which is connected to the optical splitter 79, while the optical label signal 77a is guided to the second optical path, which is connected to the optical receiver 78e.

The optical signal 76a separated into the first optical path passes the optical splitter 79 to be guided to each of a plurality of optical gates 75a–75d. On the other hand, the optical label signal 77a separated into the second optical path is received by the optical receiver 78e for the analysis of the address information of the optical signal 76a. One optical gate corresponding to the addressed communication node out of the optical gates 75a–75d is driven according to the address information of the optical signal 76a carried by the optical label signal so that the optical signal 76a is permitted to only pass this optical gate. In other words, in the case of the optical signal 76a addressed to the communication node #3 from the communication node #1, only the optical gate 75c corresponding to the communication node #3 is driven to let the optical signal 76a pass.

The optical signal 76a that has passed the optical gate 75c is guided to the optical receiver 78c of the communication node #3 through the output port of the router 80 and the optical transmission line 82c so that the optical signal 76a transmitted from the communication node #1 arrives at the addressed communication node #3.

Similarly, the optical signal addressed from a communication node #m (#m is any one of #1 through #4) to other communication node #n (#n is any one of #1 through #4 not including #m) arrives at the addressed communication node #n.

Concerning the communication between the above communication node #1 and the communication node #3, in order for the optical signal 76a addressed from the communication node #1 to the communication node #3 to arrive at the addressed communication node #3 without losing its portion or whole, it is necessary to let the optical signal 76a pass the optical gate 75c with proper timing. In order to do so, it is necessary to correctly set the transmission time lag between the optical signal 76a and the optical label signal 77a to be transmitted from the communication node #1.

Therefore, according to the present invention, each communication node transmits an optical signal addressed to itself so that the optical signal returned, through router 80, to the communication node from which the optical signal has been transmitted is diagnosed whether it has been received without an error or not, and, based on the result of the diagnosis, the time lag T between the optical signal and the corresponding optical label signal is set by each of the controllers (transmission time lag adjusters) 110a–110d.

The operations of the controllers 110a–110d according to the present invention will be explained referring to the flow chart shown in FIG. 24.

Each of the controllers 110a–110d of the communication nodes first sets the relative transmission time lag T between the loop-back optical signal to be transmitted to itself for testing and the optical label signal carrying the address information of the loop-back optical signal is set as T' (Step 1). The time lag T', as an initial value, may be either a predetermined value or a value that can be estimated empirically based on the transmission line length.

After setting the relative transmission time lag T as T', each of the communication node controllers 110a–110d sends out an optical label signal for setting the optical gate in the closed state, connected to the optical receiver 78i (i is any one of a, b, c and d) of the communication node that sent the optical label signal, and then transmits the loop-back optical signal and the corresponding optical label signal to the router 80, maintaining the relative transmission time lag T (T') (Step 2).

Each of the controllers 110a–110d of the communication nodes receives the loop-back optical signal, which has been transmitted from each of the communication nodes, through the router 80 and the optical receiver 78i (i is any one of a, b, c and d) dedicated for the communication node for receiving the loop-back optical signal (Step 3).

Subsequently, each of the controllers 110a–110d of the communication nodes diagnoses whether the received loop-back optical signal has been received without an error (Step 4).

When the result of the diagnosis in step 4 indicates that the loop-back optical signal has not been received without an error, each of the controllers 110a–110d of the communication nodes re-set the relative transmission time lag T (T') to T+ΔT (ΔT is a predetermined infinitesimal time), and the processing goes back to step 2 (Step 5) to repeat the processing in steps S2, S3 and S4.

When the result of the diagnosis in step 4 indicates that the loop-back optical signal has been received without an error, each of the controllers 110a–110d of the communication nodes completes the setting of the relative transmission time lag T (Step 6).

As described previously, the optical path lengths between the output ports of each optical splitter 79 and the optical gates 75a–75d, respectively connected to the output ports of each optical splitter 79 are set equal to one another, so that the transmission time lag T set based on the loop-back optical signal transmitted to the communication node that transmitted it can be applied directly to that of the optical signal addressed to other communication nodes.

As described above, according to the present invention, the communication route for guiding the loop-back optical signal, transmitted from each of the communication nodes 100a–100d (communication nodes #1–#4), to itself through the router 80 is added newly so that the transmission time lag T between the optical signal and the corresponding optical label signal independently while confirming the degree of the error of the loop-back optical signal for testing, thereby making easier the operation for setting the relative transmission time lag T at each communication node and largely reducing the work load therefor.

Composition Example 2 of the Second Embodiment

Figure 24:
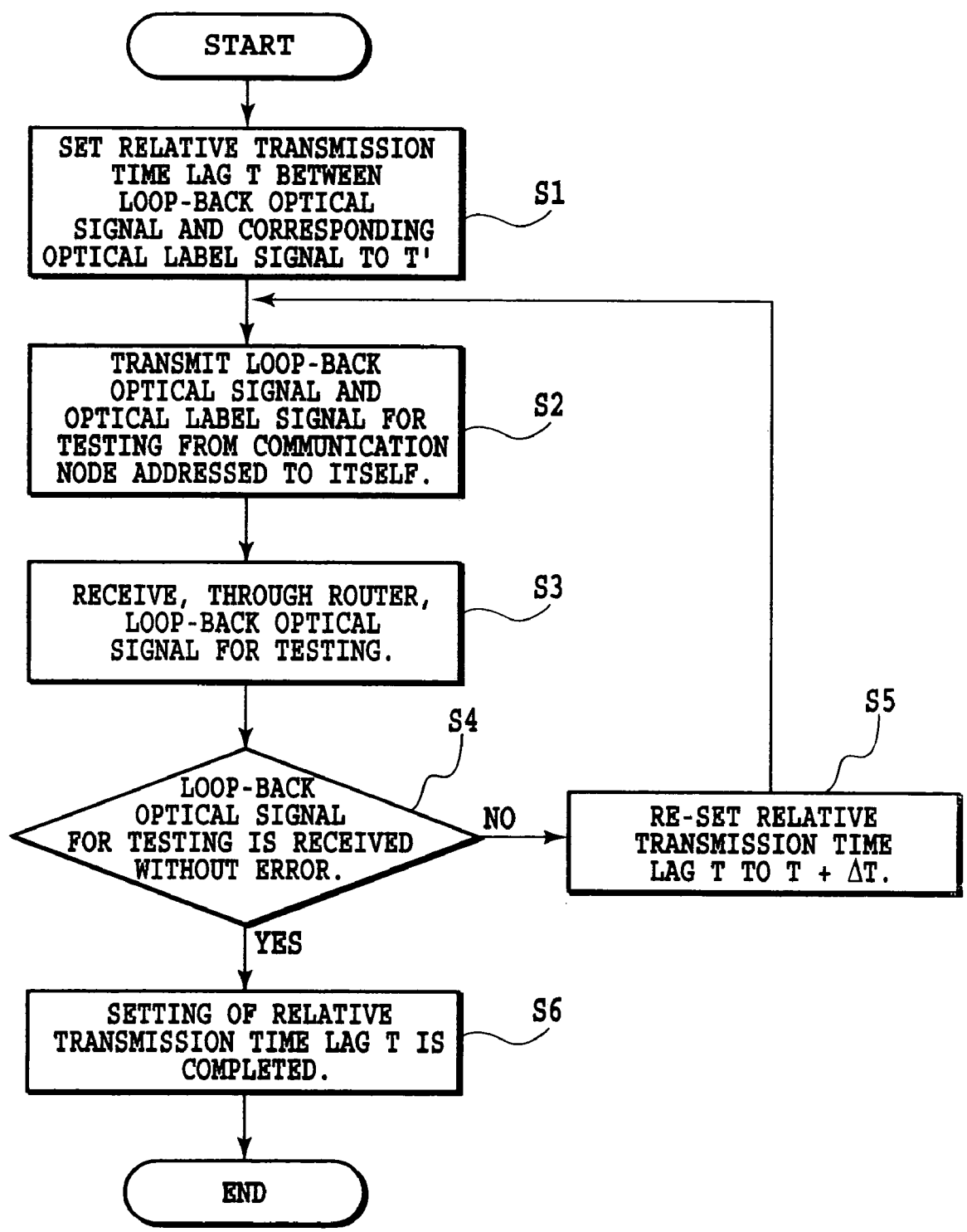
FIG. 24 is a flow chart showing the operation procedure of the first example of the optical communication system according to the second embodiment of the present invention.

In the case of the processing procedure of the composition example 1 according to the second embodiment of the present invention as is described referring to FIG. 24, in order to raise the data communication efficiency among the communication nodes 100 (the representative number of 100a–100d), in order for the time lag ΔT between the time at which the optical gate 75 (representative number of 75a–75d) is driven into the state for permitting the passage of the optical signal and the time at which the optical signal has arrived at the optical gate 75 to be reduced as far as possible, it is necessary to predetermine the value of the time lag T' of the initial value so as to set the time lag T' of the initial value to be set in the step S1 to a relatively small value and predetermine the time lag T' of the initial value for undergoing the processing of the step 5 at least once.

Figure 25:
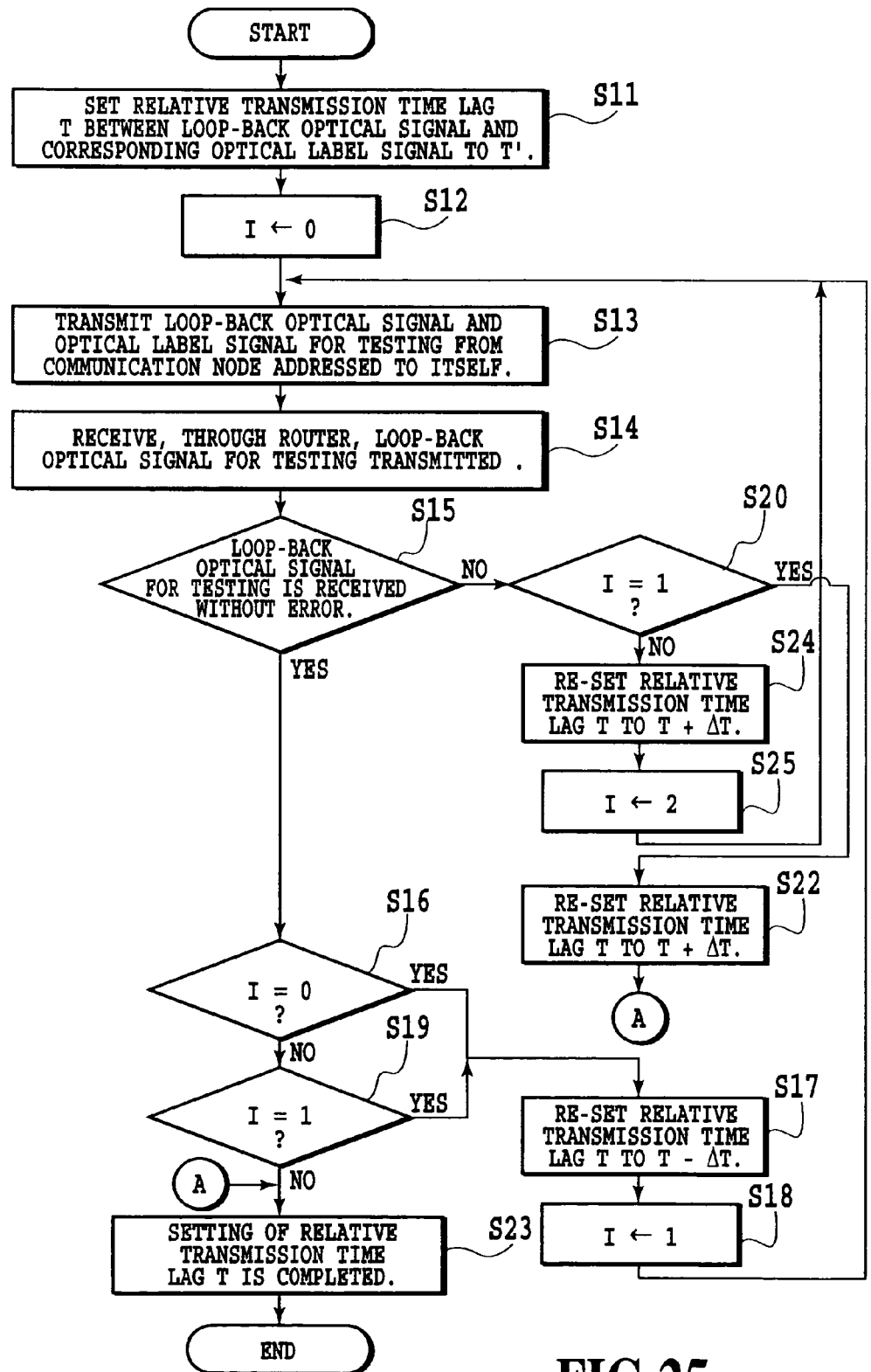
FIG. 25 is a flow chart showing the operation procedure of the second example of the optical communication system according to the second embodiment of the present invention.

Thus, in order to eliminate such cumbersome consideration in reference to the initial value T', even if the initial value of the time lag T' is set without restraint, the composition example 2 of the second embodiment of the present invention, illustrated by the flow chart shown in FIG. 25, is designed so that the relative transmission time lag T can be set for minimizing as far as possible the time lag ΔT occurring before the optical signal 76 arrives at the optical gate 75.

In FIG. 25, steps S11, S13, S14, S15, S24 and S23 are for the processes similar to the steps S1, S2, S3, S4, S5 and S6 shown in FIG. 24. Further, the I's in steps S12, S16, S18, S19, S20 and S25 denote control flags respectively.

Since the time lag T' of the initial value is relatively large, when the determination in step S15, for diagnosing whether the loop-back optical signal for testing has been received without an error or not, is affirmative from the beginning, the control proceeds from step S16 to step S7, and each of the controllers 110a–110d of the communication nodes re-sets the relative transmission time lag T to T−ΔT to change the flag I into 1 and returns to the above step S13.

After this, when the determination in step S15 is affirmative, the processing proceeds to step S16 and step S19, and the processing in step S17 is repeated.

After this, when the determination in step S15 has become negative, the process proceeds from step S20 to step S22, and the relative transmission time lag T is re-adjusted to (T+ΔT) by adding ΔT, the amount subtracted excessively, to the relative transmission time lag T to complete the setting of the relative transmission time lag T (Step S23).

On the other hand, since the time lag T' of the initial value is relatively small, when the determination in step S15, for determining whether the optical signal for testing has been received without an error or not, is negative in the beginning, the steps similar to those of the first embodiment shown in FIG. 24 will be followed. That is, in this case, the adding operation (T+ΔT) in step S24, by way of the route for returning to step S13 through steps S15, S20, S24 and S25, is repeated until the determination in step S15 become affirmative, and, when the determination in step S15 has become affirmative, the setting of the relative transmission time lag T by way of steps S16 and S19 is completed (Step S23).

Composition Example 3 of the Second Embodiment

Figure 26:
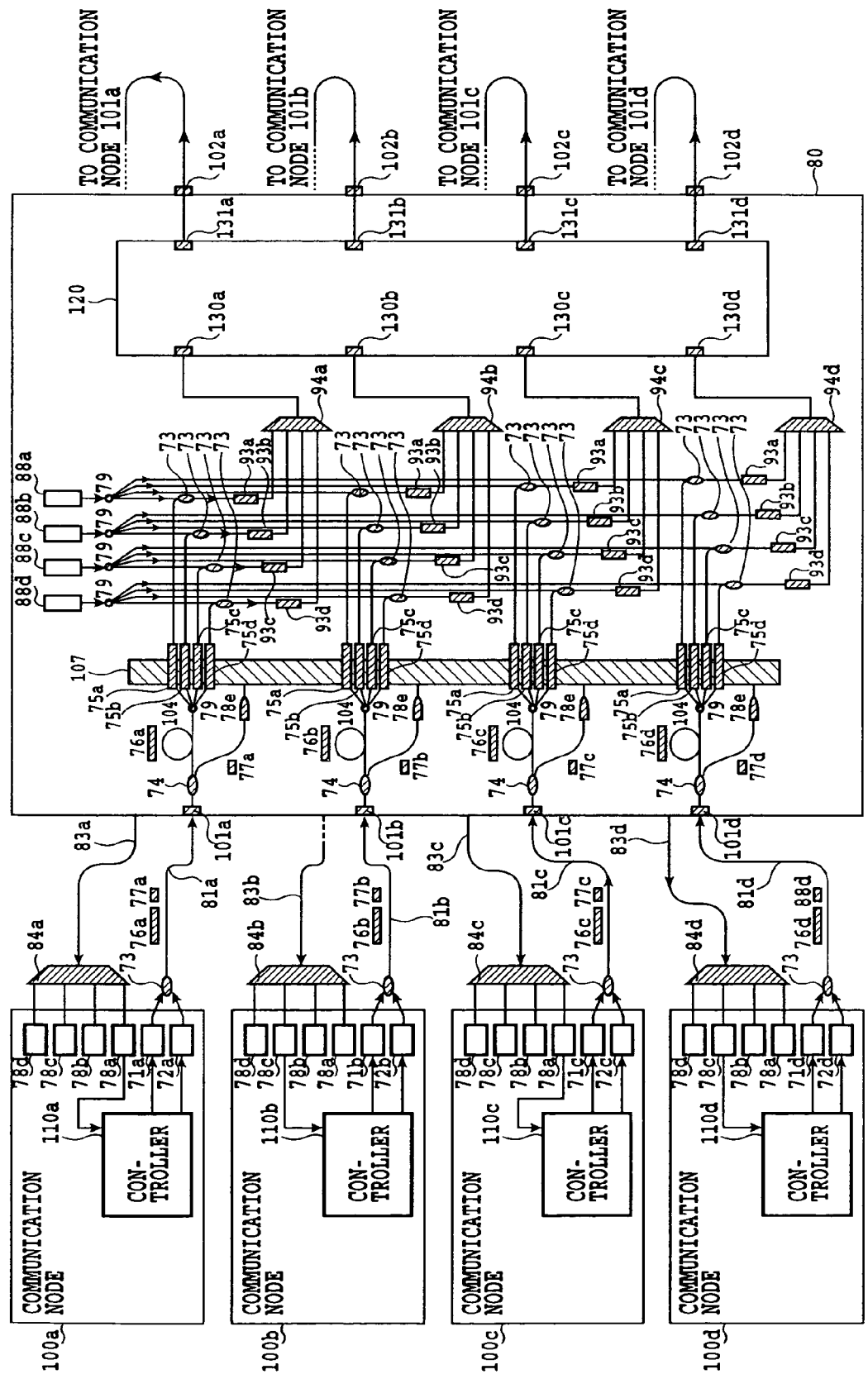
FIG. 26 is a block diagram showing the third example of the optical communication system according to the second embodiment of the present invention.

FIG. 26 shows the composition example 3 of the second embodiment of the present invention. In the case of the composition example 1 of the second embodiment, the output ports of the optical gates 75a–75d are respectively connected directly to the optical receivers 78a–78d of the communication nodes 100a–100d through the optical transmission lines 82a–82d. In contrast, in the case of the present example, within the router 80, which is similar to the one in the case of the composition example I of the second embodiment, the shared multi-wavelength optical source equipment as an optical part not having the switching function for passing/intercepting the optical signal, which is similar to the one in the case of the first embodiment shown in FIG. 7, is connected between each of the optical gates 75a–75d and each of the optical receivers 78a–78d.

The composition example 3 of the second embodiment of the present invention will be explained referring to FIG. 26.

In each of the communication nodes 100a–100d, Numerals 71a–71d respectively denote the optical signal transmitters respectively including the optical source employed for transmitting the optical signal; Numerals 72a–72d, the optical label signal transmitters respectively including the optical source employed for transmitting the optical label signal; Numerals 78a–78d, optical receivers; Numerals 110a–110d, controllers (transmission time lag adjusters) relating to the present invention.

Further, Numeral 73 denotes the optical combiner; Numerals 76a–76d, optical signals; Numerals 77a–77d, optical label signals; Numerals 84a–84d, wavelength demultiplexers; Numerals 81a–81d, optical transmission lines respectively connecting the optical combiner 73 of each communication node and the input port of the router 80; Numerals 83a–83d, the optical transmission lines respectively connecting each of the output ports of the router 80 and each of the wavelength demultiplexers 84a–84d of each of the communication nodes 100a–100d.

In the router 80, Numerals 74 denotes a wavelength demultiplexer; Numeral 104, an optical delay device; Numerals 75a–75d, optical gates; Numerals 101a–101d, input ports; Numerals 102a–102d, output ports; Numeral 79, an optical splitter; Numerals 88a–88d, the shared optical sources; Numerals 93a–93d, wavelength converters; Numerals 94a–94d, wavelength multiplexers; Numeral 107, an optical gate control system. The optical path lengths between the individual output ports of each optical splitters 79 and the individual optical gates 75a–75d are made equal to one another.

Numeral 120 denotes a cyclic-wavelength arrayed-waveguide grating; Numerals 130a–130d, the input ports of the cyclic-wavelength arrayed-waveguide grating 120; Numerals 131a–131d, the output ports of the cyclic-wavelength arrayed-waveguide grating 120.

In the case of the composition shown in FIG. 26, there are provided four communication nodes, but the number of the communication nodes is not limited to this number in the example case of the present invention.

An optical fiber type optical combiner, for example, may be employed as the optical combiner 73; an optical fiber type wavelength demultiplexer, for example, as the wavelength demultiplexer 74; optical parts including the semiconductor optical amplifier, for example, as the optical gates 75a–75d; a silica glass optical waveguide type optical splitter, for example, as the optical splitter 79; optical fibers, for example, as the optical transmission lines 81a–81d and 83a–83d; silica glass waveguide type wavelength demultiplexers, for example, as the wavelength demultiplexers 84a–84d; distributed feedback semiconductor lasers, for example, as the shared optical sources 88a–88d; semiconductor optical amplifier type optical wavelength converters utilizing cross gain modulation, for example, as the wavelength converters 93a–93d; silica glass optical waveguide type wavelength demultiplexers, for example, as the wavelength multiplexers 94a–94d; optical fiber type optical delay device, for example, as the optical delay device 104, but the present invention is not limited to these applications.

The wavelengths of the shared optical sources 88a, 88b, 88c and 88d are λa, λb, λc, and λd respectively. Each of the wavelength converters 93a, 93b, 93c and 93d are provided with the lights respectively having the corresponding wavelengths λa, λb, λc, and λd from the shared optical sources to convert the wavelength of the optical signal incoming through the optical gates 75a–75d connected on the side of the input port of the wavelength converter into the wavelength of the shared optical source. More particularly, the wavelength of the optical signal which has passed the optical gate 75a is converted into the wavelength λa by the optical wavelength converter 93a and outputted to the output port of the wavelength converter 93a. The wavelength of the optical signal which has passed the optical gate 75b is converted into the wavelength λb by the wavelength converter 93b and is outputted from the output port of the wavelength converter 93b. The wavelength of the optical signal which has passed the optical gate 95c is converted into wavelength λc and outputted from the output port of the wavelength converter 93c. The wavelength of the optical signal which has passed the optical gate 75d is converted into wavelength λd by the optical wavelength converter 93d and outputted from the output port of the wavelength converter 93d.

The wavelength routing characteristic of the cyclic-wavelength arrayed-waveguide grating 120 will be explained referring to FIG. 27. When the lights respectively having wavelengths λa, λb, λc and λd are respectively fed to the input port 130a, as shown in FIG. 27, λa is outputted from the output port 131a; λb from the output port 131b; λc from the output port 131c; λd from the output port 131d. Similarly, when the lights respectively having wavelengths λa, λb, λc, and λd are fed to the input ports 130a–130d respectively, the lights respectively having wavelengths λa, λb, λc, and λd are respectively outputted from the output ports 131a–131d according to the rule shown in FIG. 27.

Figure 28:
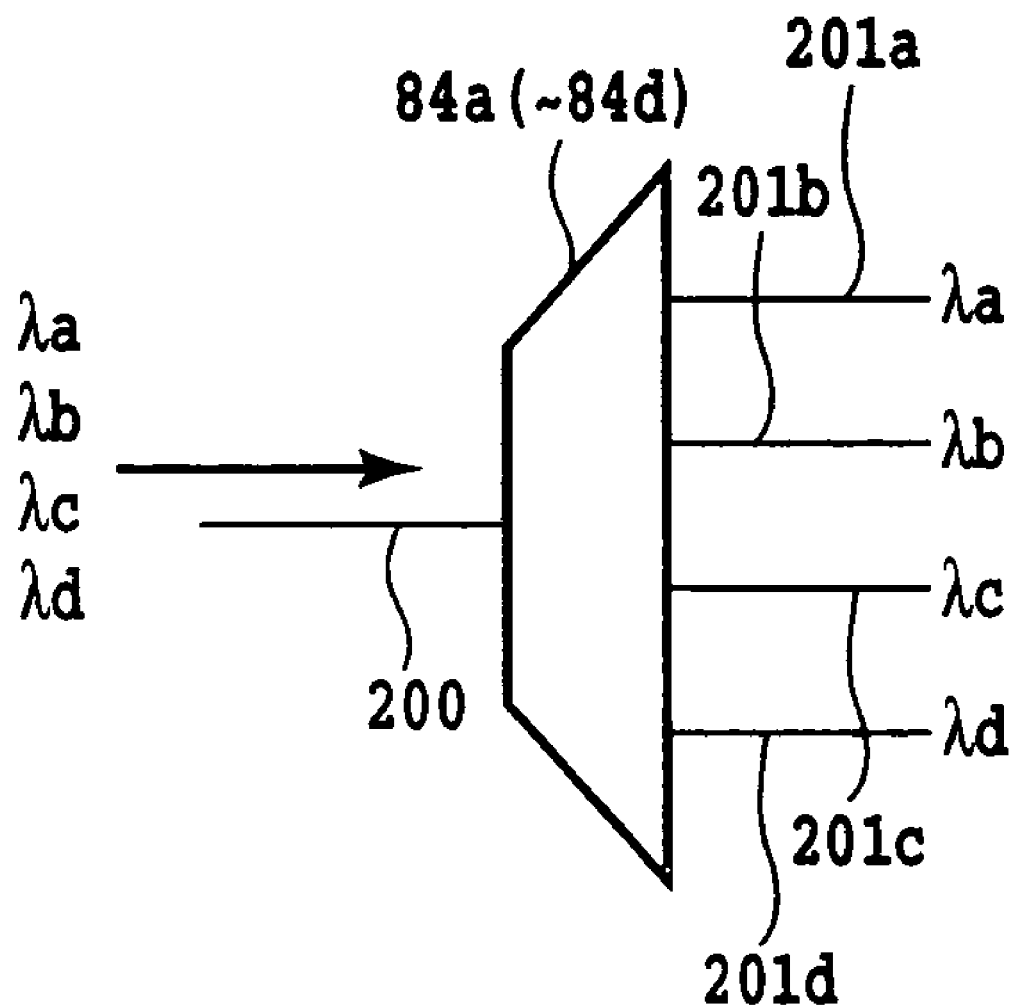
FIG. 28 is a schematic diagram showing the input-output relation of the wavelength demultiplexers 84a–84d.

The wavelength demultiplexers 84a–84d of each of the communication nodes 100a–100d respectively have a function of selectively outputting the incoming lights according to their wavelength, as shown in FIG. 28, to different output ports 201a–201d. The wavelength demultiplexers 84a–84d employed for the present embodiment respectively output, as shown in FIG. 28, the lights respectively having the wavelengths λa, λb, λc, and λd from the output ports 201a, 201b, 201c and 201d respectively.

First, the process of the communication among the communication nodes in the case of the network composition shown in FIG. 26 will be explained. In the following, the process, in which the optical signal 76a sent out from the communication nodes 100a connected to the input port 101a of the router 80 is transmitted to the destination node 100c, will be explained giving an example.

The optical signal 76a and the optical label signal 77a sent out from the communication node 100a addressed to the communication node 100c are inputted to the input port 101a of the router 80. The optical signal 76a and the optical label signal 77a fed to this input port 101 are separated respectively by the wavelength demultiplexer 74 for the first optical path connected to the optical receiver 78e, and for the second optical path connected to the optical delay device.

The optical label signal 77a routed to the first optical path is guided to the optical receiver 78e connected to the optical gate control system 107. On the other hand, the optical signal 76a routed to the second optical path is guided to the optical gates 75a–75d through the optical delay device 104 and the optical splitter 79.

The optical signal 76a fed to the optical gates 75a–75d is outputted from the optical gate 75i (i denotes any one of a, b, c and d), which has been selected according to the information of the optical label signal 77a which has previously been received by the optical receiver 78e. In this case, the selection of the optical gate is controlled by the optical gate control system 107. The output port of the optical gate 75i is connected to the optical wavelength converter 93j (j denotes any one of a, b, c and d), and the optical length converter 93j converts the wavelength of the optical signal 76a into the wavelength adapted for routing to the communication node 100c by the cyclic-wavelength arrayed-waveguide grating 120 having the wavelength routing function.

In the case of the communication from the communication node 100a to the communication node 100c, since each of the output ports of the optical gates 75a–75d are connected to the input port 130a of the cyclic-wavelength arrayed-waveguide grating 120 by way of the optical combiner 73, the wavelength converters 93a–93d and the wavelength multiplexer 94a, the wavelength of the optical signal routed to the communication node 100c by the cyclic-wavelength arrayed-waveguide grating 120 is λc as illustrated in FIG. 27. In consequence, the optical gate 75c is selected to open the optical gate by the control signal outputted from the optical control system 107 for passing and outputting the optical signal 76a from the output port of the optical gate 75c, which is connected to the wavelength converter 93c designed for converting the wavelength of the optical signal 76c into the wavelength λc.

The optical signal 76a outputted from the optical gate 75c is guided to the wavelength converter 93c, which is connected to the output port of the optical gate 75c, to have its wavelength converted into λc and guided to the input port 130a of the cyclic-wavelength arrayed-waveguide grating 120 by way of the wavelength multiplexer 94. The optical signal 76a guided to the input port 130a is outputted from the output port 131c of the cyclic-length arrayed-waveguide grating 120 connected to the communication node 100c by the wavelength routing function of cyclic-wavelength arrayed-waveguide grating 120 as shown in FIG. 27.

The optical signal 76a outputted from the output port 131c passes the output port 102c of the router 80 and the optical transmission line 83c to arrive at the input port of the wavelength demultiplexer 84c in the communication node 100c. The wavelength demultiplexers 84a–84d employed for this composition example have the wavelength demultiplexing characteristic shown in FIG. 28, so that the optical signal 76a is outputted from the output port 102c of the wavelength demultiplexer 84c and received by the optical receiver 78c of the communication node 100c.

Similarly, the optical signal 76i (i denotes any one of a, b, c and d) transmitted from the communication node 100i (i denotes any one of a, b, c and d) to the communication node 100j (j denotes any one of a, b, c and d) is sent to the communication node 100j through the router 80.

Especially, in the router 80, the optical gates 75a–75d, which are set in the open state respectively when the optical signals 76a–76d and the optical label signals 77a–77d transmitted from the communication nodes 100a–100d addressed to the communication node that transmitted them are received, are provided. Therefore, when the communication node 100a has transmitted the optical signal 76a addressed to itself, the optical gate 75a is set in the open state, whereby the wavelength of the optical signal 76a is converted into λa by the wavelength converter 93a. The optical signal 76a having wavelength λa is guided to the output port 131a of the router 80, connected to the communication node, by the cyclic-wavelength arrayed-waveguide grating 120 and received by the controller 110a of the node 100a through the wavelength demultiplexer 84 and the optical receiver 78a.

Similarly, when the communication node 100b has transmitted the optical signal 76b addressed to itself, the optical gate 75c is set in the open state, whereby the wavelength of the optical signal 76b is converted into λc by the optical wavelength converter 93c, guided to the output port 131b of the router 80, connected to the node 100b, by the cyclic-wavelength arrayed- waveguide grating and received by the controller 110b of the node 100b through the wavelength demultiplexer 84b and the optical receiver 78c.

Similarly, when the communication node 100c has transmitted the optical signal 76c addressed to itself, the optical gate 75a is set in the open state, whereby the wavelength of the optical signal 76c is converted into λa by the wavelength converter 93a, guided to the output port 131c of the router 80, connected to the node 100c, by the cyclic-wavelength arrayed-waveguide grating and received by the controller 110c of the node 100c through the wavelength demultiplexer 84c and the receiver 78a.

Further similarly, when the communication node 100d has transmitted the optical signal 76d addressed to itself, the optical gate 75c is set in the open state, whereby the wavelength of the optical signal 76d is converted into λc by the wavelength converter 93c, guided to the output port 131d of the router 80, connected to the node 100d, by the cyclic-wavelength arrayed-waveguide grating and received by the controller 110d of the self-communication node 100d through the wavelength demultiplexer 84d and the optical receiver 78c.

In the case of the router 80 of this example too, it is necessary for the optical signal 76i (i denotes any one of a, b, c and d) to pass the optical gate 75j (j denotes any one of a, b, c and d) respectively with proper timing. Therefore, in the case of the present example too, similarly to the case of the composition example 1 of the second embodiment, each of the communication nodes 100a–100d has the transmission time lag adjusting function relating to the present invention, namely, the functions for transmitting the optical signal 76i addressed to the communication node that transmitted it and the corresponding optical label signal 77i (i denotes any one of a, b, c and d) carrying the address information of the optical signal maintaining a certain transmission time lag T, receiving the optical signal addressed to the communication node that transmitted it through the router 80, diagnosing the received optical signal by each of the controllers 110a–110d of the communication node and independently and self-supportingly adjusting the transmission time lag between. the optical signal and the optical label signal according to the result of the diagnosis.

In the case of this example, the procedure for setting the transmission time lag T between the optical signal 76i and the corresponding optical label signal which are transmitted from each of the communication nodes 100a–100d are similar to those shown in FIG. 24 and FIG. 25.

Other Embodiment

Needless to say, the object of the present invention can also be attained by providing the system or the equipment with a memory (or storage medium) storing the program of a software for realizing the function of the embodiment so that the computer (CPU or MPU) of such system or equipment reads out the program codes stored in the memory for execution of the software. In this case, the program codes read out from the memory are employed for performing the function of previously described embodiments, and the memory storing the program codes constitutes the present invention. For the memory for storing the program codes or the data of variables such as the table or the like, floppy disk, hard disk, optical disk, optical magnetic disk, CD-ROM or the like mat be employed.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. Optical communication equipment comprising:
a plurality of communication nodes having an optical signal transmitter for transmitting the optical signals and an optical label signals transmitter for transmitting the optical label signals carrying the control information concerning the routing of the optical signals respectively, for transmitting the optical signals and the corresponding optical label signals giving a relative transmission time lag;
a router having wavelength demultiplexers connected to each of the communication nodes through the optical transmission line for separating the optical signals from the optical label signals, optical label signal receivers for receiving the optical label signals separated by one of the wavelength demultiplexers, optical splitters for branching the optical signals separated by one of the wavelength demultiplexers to a plurality of optical paths of a substantially the same length, a plurality of optical gates for routing by passing or intercepting the optical signal with respect to the corresponding optical path of the a plurality of optical paths according to the information carried by the optical label signal, said router pass or intercept the optical signal by selectively driving the a plurality of optical gates according to the control information of the optical label signal received by one of the optical label signal receivers;

each of said communication nodes comprises:
- an optical signal transmission means for transmitting said optical signals addressed to the communication node that transmitted it through said optical transmitter;
- an optical label signal transmission means for transmitting said optical label signal carrying the routing information of said optical signal through said optical label signal transmitter;
- an optical receiver for receiving said optical signal addressed to the communication node that transmitted it and returned through said router;
- a diagnosing means for diagnosing said optical signal received by said optical receiver; and
- an adjusting means for adjusting the transmission time lag between said optical signal and said optical label signal according to the result of the diagnosis by the diagnosing means.

2. Optical communication equipment according to claim 1, wherein said router includes optical gates, which are set in the open state upon receipt of said optical signal transmitted from each communication node addressed to the communication node that transmitted it and said corresponding optical label signal.

3. Optical communication equipment according to claim 2, wherein said router is connected to optical transmission lines for returning said optical signal addressed to the communication node that transmitted it, which has passed the optical gate, to the communication node that transmitted said optical signal.

* * * * *